US010836515B2

(12) United States Patent
Doggett et al.

(10) Patent No.: US 10,836,515 B2
(45) Date of Patent: Nov. 17, 2020

(54) PRESSURE-ASSISTED LINEAR SEAL

(71) Applicant: UNITED STATES OF AMERICA AS REPRESENTED BY THE ADMINISTRATOR OF NASA, Washington, DC (US)

(72) Inventors: William R. Doggett, Poquoson, VA (US); Timothy S. Roach, Virginia Beach, VA (US); Jerry E. Warren, Hampton, VA (US); Judith J. Watson, Yorktown, VA (US); Thomas C. Jones, Newport News, VA (US); Richard K Bird, Grafton, VA (US); Vincenzo M. Le Boffe, Carrollton, VA (US); William M. Langford, Hampton, VA (US); Lana P. Hicks-Olson, Surry, VA (US); Samuel James, Portsmouth, VA (US); Clarence E. Stanfield, Hampton, VA (US); Alberto Makino, Stanford, CA (US); Bryan C. Yount, Sunnyvale, CA (US); Khadijah I. Shariff, Houston, TX (US); Molly M. Selig, League City, TX (US); Douglas A. Litteken, Houston, TX (US); Winfred S. Kenner, Yorktown, VA (US); David F. Moore, Poquoson, VA (US); Danny J. Lovaglio, Virgina Beach, VA (US); Laura A. Leybold, Hampton, VA (US); Earl T. Hall, Newport News, VA (US); James E. Phelps, Smithfield, VA (US); Arlon B. Sullivan, Chesapeake, VA (US); Fred M. Whitehead, Newport News, VA (US)

(73) Assignee: UNITED STATES OF AMERICA AS REPRESENTED BY THE ADMINSTRATOR OF NASA, Washington, DC (US)

( * ) Notice: Subject to any disclaimer, the term of this patent is extended or adjusted under 35 U.S.C. 154(b) by 171 days.

(21) Appl. No.: 16/119,293

(22) Filed: Aug. 31, 2018

(65) Prior Publication Data
US 2019/0009932 A1 Jan. 10, 2019

Related U.S. Application Data

(63) Continuation-in-part of application No. 15/441,318, filed on Feb. 24, 2017.
(Continued)

(51) Int. Cl.
*B64G 1/66* (2006.01)
*B64G 1/10* (2006.01)
(Continued)

(52) U.S. Cl.
CPC .............. *B64G 1/66* (2013.01); *B64G 1/10* (2013.01); *B64G 1/12* (2013.01); *B64G 2001/224* (2013.01)

(58) Field of Classification Search
CPC ... B64G 1/66; B64G 1/10; B64G 1/12; B64G 2001/224
See application file for complete search history.

(56) References Cited

U.S. PATENT DOCUMENTS 4,562,979 A * 1/1986 Taylor ...................... B64G 9/00
220/8
6,231,010 B1 5/2001 Schneider et al.
(Continued)

OTHER PUBLICATIONS

William R. Doggett et al., Non-Axisymmetric Inflatale Pressure Structure (NAIPS) Concept that Enables Mass Efficient Packageable Pressure Vessels with Sealable Openings, NASA/TM-2016-219331, Aug. 2016, National Aeronautics and Space Administration, Langley Research Center, Hampton, Virginia (42 pages).
(Continued)

*Primary Examiner* — Valentina Xavier

(74) *Attorney, Agent, or Firm* — M. Bruce Harper; Jonathan B. Soike; Helen M. Galus

(57) ABSTRACT

An inflatable pressure structure includes an airtight flexible membrane having collapsed and inflated configurations. The inflatable pressure structure includes an elongated pressure-assisted seal that is configured to selectively seal an opening in the airtight flexible membrane. The pressure-assisted seal includes first and second seal components that sealingly engage one another and prevent escape of gas from inside the airtight flexible membrane. The airtight flexible membrane, when inflated, generates a force transverse to the pressure-assisted seal tending to pull the first and second seal components apart. Pressurized gas inside the airtight flexible membrane causes the first and second seal components to more securely engage one another whereby a force transverse to the pressure-assisted seal does not disengage the first and second seal components.

20 Claims, 19 Drawing Sheets
(2 of 19 Drawing Sheet(s) Filed in Color)

Related U.S. Application Data

(60) Provisional application No. 62/299,761, filed on Feb. 25, 2016.

(51) Int. Cl.
  *B64G 1/12* (2006.01)
  *B64G 1/22* (2006.01)

(56) References Cited

U.S. PATENT DOCUMENTS

| | | | |
|---|---|---|---|
| 6,321,746 B1 * | 11/2001 | Schneider | A61G 10/026 |
| | | | 128/202.12 |
| 6,547,189 B1 | 4/2003 | Raboin et al. | |
| 6,974,109 B1 * | 12/2005 | Mezits | B64G 1/52 |
| | | | 244/158.3 |
| 7,295,884 B1 | 11/2007 | Spexarth | |
| 7,509,774 B1 | 3/2009 | Johnson et al. | |
| 7,735,265 B2 | 6/2010 | Tinker et al. | |
| 7,840,387 B1 | 11/2010 | Spexarth | |
| 8,070,105 B2 | 12/2011 | Johnson et al. | |
| 8,122,646 B1 | 2/2012 | Johnson | |
| 8,266,866 B1 | 9/2012 | Johnson | |
| 2009/0019784 A1 * | 1/2009 | Tinker | E04B 1/3211 |
| | | | 52/2.11 |
| 2017/0247127 A1 | 8/2017 | Doggett et al. | |

OTHER PUBLICATIONS

Thomas C. Jones et al., Non-Axisymmetric Inflatable Pressure Structure (NAIPS) Full-Scale Pressure Text, American Institute of Aeronautics and Astronautics, Jan. 9, 2017, NASA Langeley Research Center, Hampton, VA (27 pages).

* cited by examiner

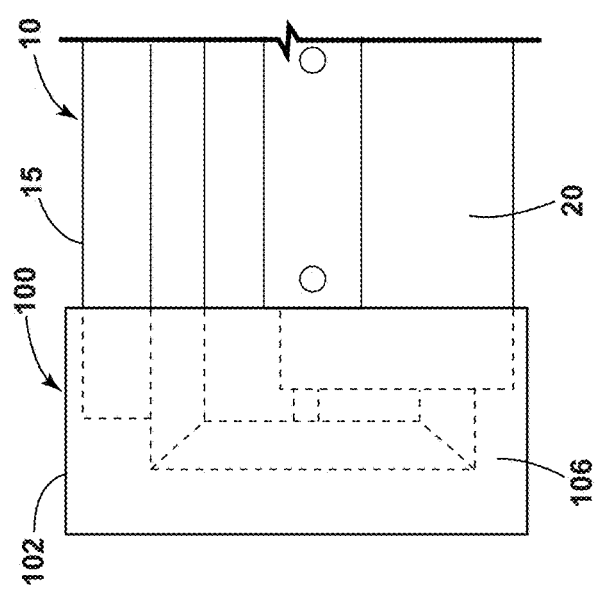
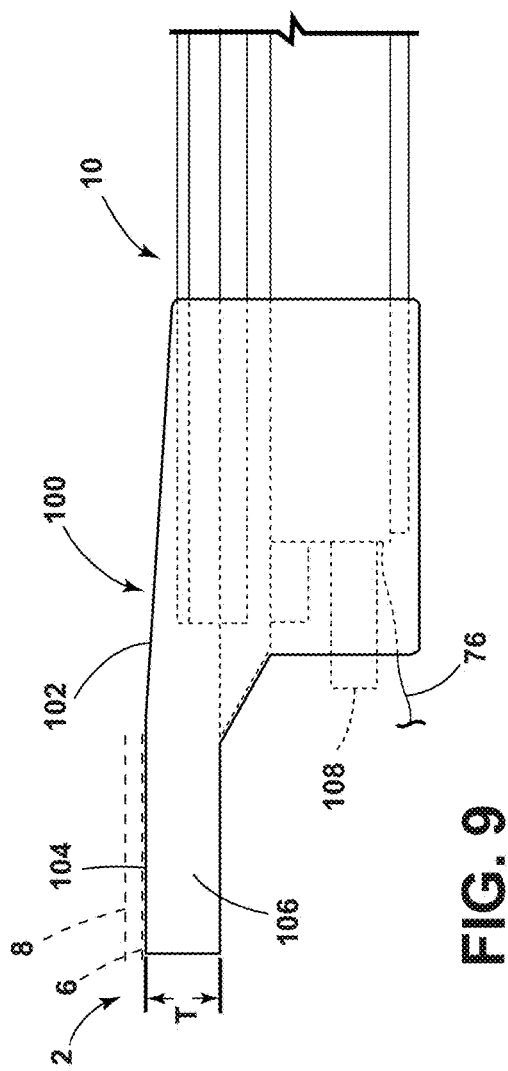

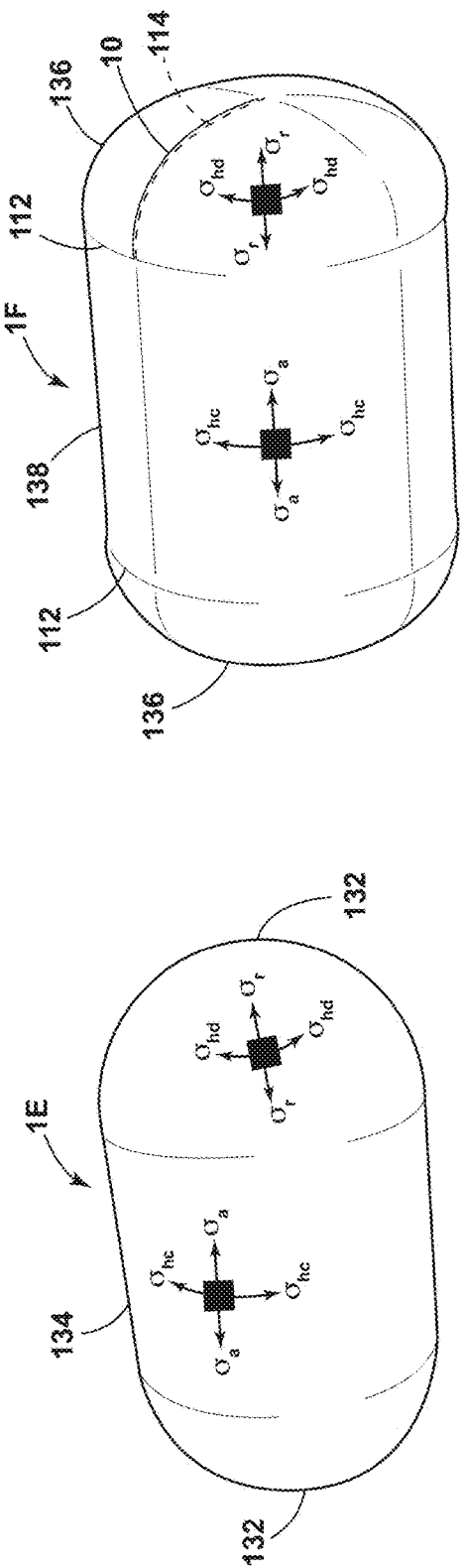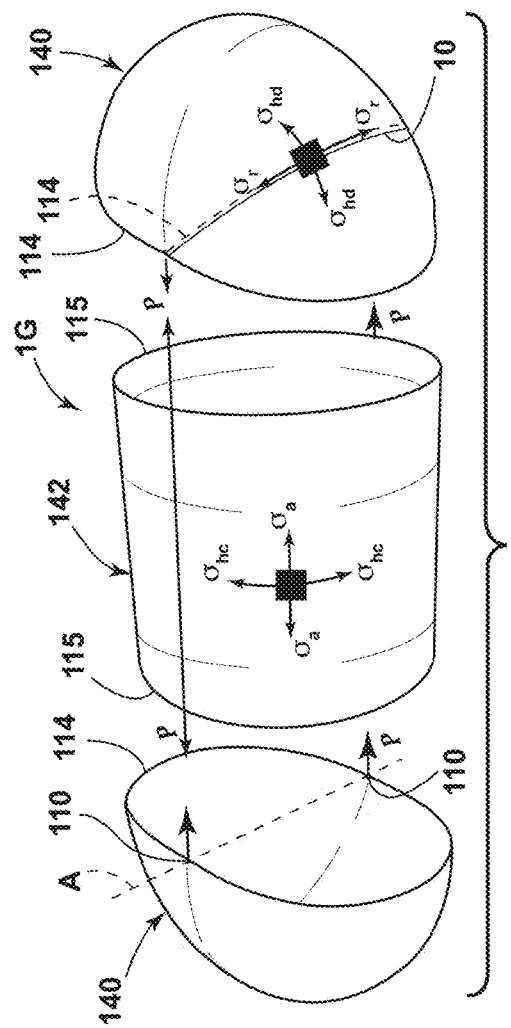
FIG. 14
FIG. 15
FIG. 16

PRESSURE-ASSISTED LINEAR SEAL

CROSS-REFERENCE TO RELATED PATENT APPLICATION

This patent application claims the benefit of priority to and is a continuation-in-part of U.S. patent application Ser. No. 15/441,318, filed on Feb. 24, 2017, which claims the benefit of and priority to U.S. Provisional Patent Application No. 62/299,761, filed on Feb. 25, 2016, the contents of which are hereby incorporated by reference in their entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND

Various types of pressure vessels (structures) have been developed. Inflatable structures or modules have been proposed for various applications, including use in space. However, known inflatable structures may suffer from various drawbacks.

BRIEF SUMMARY

One aspect of the present disclosure is an inflatable pressure structure including an airtight flexible membrane that is configured to change from a collapsed configuration when evacuated to an inflated configuration when filled with pressurized gas. The flexible membrane includes elongated first and second edge portions that can be spaced apart to form an opening through the flexible membrane. The inflatable pressure structure includes an elongated pressure-assisted seal. The pressure-assisted seal includes an elongated flexible first seal component extending along the first edge portion, and an elongated flexible second seal component extending along the second edge portion. The first seal component comprises a flange and an enlarged distal portion forming a first sealing surface. The second seal component has an open cross-section, and includes a pair of flanged portions with spaced apart ends forming an elongated channel that is configured to removably receive the enlarged distal portion of the first seal component. The channel forms a second sealing surface. The flanged portions of the second seal component are configured to clamp onto the enlarged distal portion when the airtight flexible membrane is filled with pressurized gas.

Another aspect of the present disclosure is an inflatable pressure structure including an airtight flexible membrane having a non-axisymmetric shape when inflated. The airtight flexible membrane includes at least one dome defining a central equatorial plane and an axis extending through opposite poles, wherein the opposite poles are spaced apart a first dimension. A radius between the axis and the airtight flexible membrane at the equatorial plane is greater than the first dimension whereby a base of the dome has an oblong shape. At least a portion of the dome of the airtight flexible membrane has a hoop stress in a direction transverse to the axis when the airtight flexible membrane is inflated, and a radial stress transverse to the hoop stress. When the airtight flexible membrane is inflated, the radial stress is at least an order of magnitude greater than the hoop stress in the domes and/or the axial stress in the barrel section may be an order of magnitude less than the hoop stress. The airtight flexible membrane includes an openable seam in the dome extending transverse to a direction of the hoop stress or in the barrel transverse to the axial stress. The inflatable pressure structure may further include an elongated pressure-assisted linear seal releasably closing the openable seam. The linear seal includes a first seal component having an enlarged distal portion, and a second component having an elongated channel that removably receives the enlarged distal portion. The second seal component clamps onto the enlarged distal portion of the first seal component when the airtight flexible membrane is inflated to form a seal between the first seal component and the second seal component. The seal prevents escape of gas through the openable seam.

In some embodiments, the at least one dome has a shape that results in zero or near zero stresses in at least one direction of the at least one dome, whereby the dome is adapted to support a linear seal extending transverse to the at least one direction without causing forces tending to open the linear seal.

Additionally or alternatively, in some embodiments, the at least one dome includes a first dome, the airtight flexible membrane including a second dome and a central portion extending between and interconnecting the first and second seal domes. The central portion is oblong in cross section when the airtight flexible membrane is inflated. In some implementations, the shape of the airtight flexible membrane results in zero or near zero stresses in at least one direction of the central portion. Additionally or alternatively, in some implementations, cordage is operably connected to the fabric layer to carry at least a portion of forces on the airtight flexible membrane whereby the size and volume of the fabric used to support the internal bladder.

Another aspect of the present disclosure is an inflatable pressure structure including an airtight flexible membrane having collapsed and inflated configurations. The inflatable pressure structure includes an elongated pressure-assisted seal that is configured to selectively seal an opening in the airtight flexible membrane when the pressure-assisted seal is in the closed configuration. The pressure-assisted seal includes first and second seal components that sealingly engage one another and prevent escape of gas from inside the airtight flexible membrane through the pressure-assisted seal when the pressure-assisted seal is in the closed configuration. The airtight flexible membrane, when inflated, generates a force transverse to the pressure-assisted seal tending to disengage the first and second seal components and open the pressure-assisted seal. Pressurized gas inside the airtight flexible membrane causes the first and second seal components to more securely engage one another when the pressure-assisted seal is in the closed position such that a force transverse to the pressure-assisted seal required to disengage the first and second seal components and open the pressure-assisted seal increases as a pressure of pressurized gas inside the airtight flexible membrane increases.

These and other features, advantages, and objects of the present disclosure will be further understood and appreciated by those skilled in the art by reference to the following specification, claims, and appended drawings.

BRIEF DESCRIPTION OF THE SEVERAL VIEWS OF THE DRAWINGS

The patent or application file contains at least one drawing executed in color. Copies of this patent or patent application publication with color drawings will be provided by the Office upon request and payment of the necessary fee.

FIG. 8 is a partially fragmentary top plan view of a seal termination overmold according to one aspect of the pressure disclosure;

FIG. 9 is a partially fragmentary side elevational view of the seal termination overmold of FIG. 8;

FIG. 14 is a partially schematic isometric view showing fabric stress in an inflatable pressure structure having equatorial cut low hoop stress shapes joined to a central cylinder;

FIG. 15 is a partially schematic isometric view showing fabric stress in a pressure vessel comprising spherical capped domes joined to a cylinder;

FIG. 16 is an exploded partially isometric view of the inflatable pressure structure of FIG. 13 showing fabric stress;

DETAILED DESCRIPTION

Figure 1:
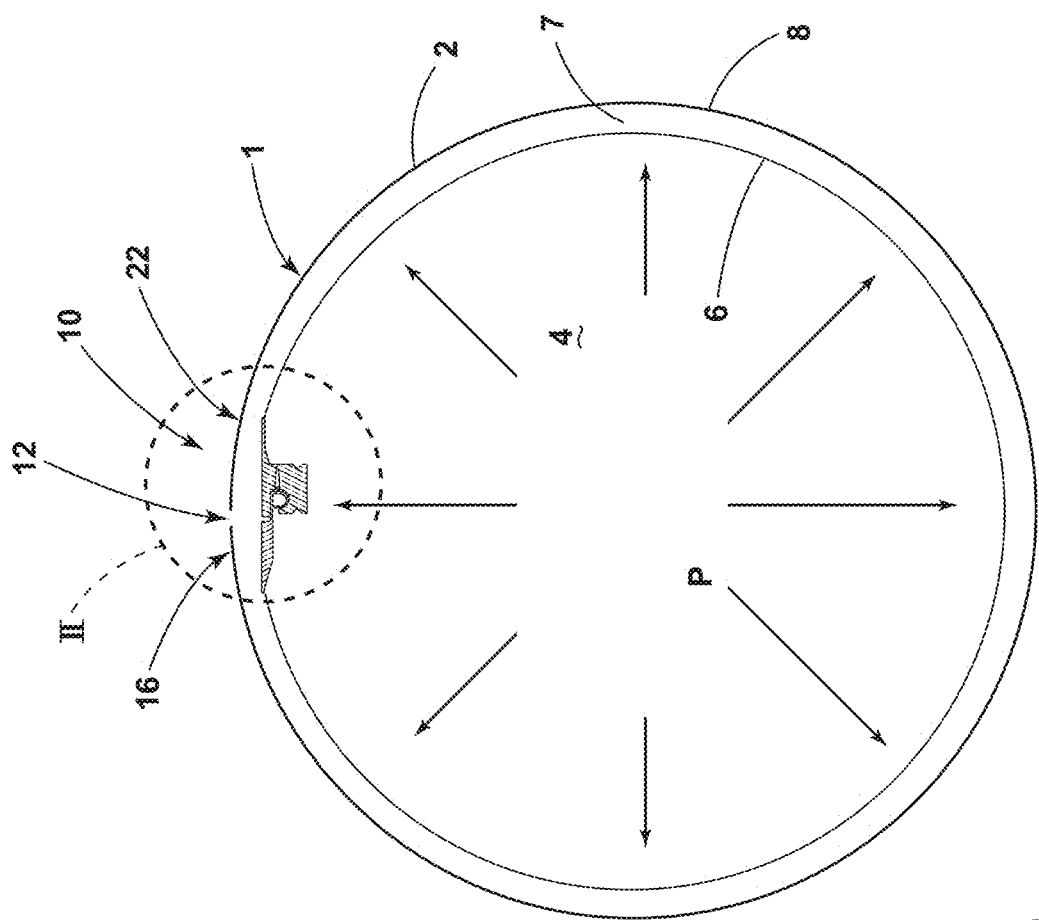
FIG. 1 is a cross-sectional view of an inflatable pressure structure, including a pressure-assisted seal according to one aspect of the present disclosure.

For purposes of description herein, the terms "upper," "lower," "right," "left," "rear," "front," "vertical," "horizontal," and derivatives thereof shall relate to the embodiment as oriented in FIG. 1. However, it is to be understood that the embodiments may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, an inflatable pressure structure 1 includes an airtight flexible membrane 2 that forms an internal space 4 when pressurized gas is present in the inflatable pressure structure 1. The airtight flexible membrane 2 may comprise an internal bladder 6 and a restraint layer 8. The internal bladder 6 and restraint layer 8 may comprise a single integrated flexible member, or separate members. A space 7 may be formed between internal bladder 6 and restraint layer 8. It will be understood that space 7 may be very small, and the internal bladder 6 and restraint layer 8 may contact one another. The internal bladder 6 may comprise a thin polymer material that is substantially impervious to gases (e.g. air) or liquids to retain pressurized gas or liquid in the internal space 4. The restraint layer 8 may comprise a high strength flexible fabric structure or the like that reinforces the internal bladder 6 and prevents excessive stress on the internal bladder 6. The various components of the airtight flexible membrane 2 are preferably flexible and capable of being folded/collapsed into a compact shape when air or other gases are evacuated from internal space 4. For example, if the inflatable pressure structure 1 is configured for use in a space environment, the internal bladder 6 may comprise a silicon coated vectran material and the restraint layer 8 may comprise a vectran material.

The airtight flexible membrane 2 may include an elongated pressure-assisted seal 10 (see also FIGS. 2 and 3) that selectively closes off and seals an opening 12 in the airtight flexible member 2. The opening 12 may be offset well to the left or right of the linear seal location. The pressure-assisted seal 10 includes an elongated first (male) seal component 15 extending along a first edge portion 16 of airtight flexible membrane 2, and an elongated second (female) seal component 20 extending along a second edge portion 22 of the airtight flexible membrane 2. The first seal component 15 includes a flange 18 and an enlarged distal end portion 24 forming a first sealing surface 26. The second seal component 20 has an open cross-sectional shape. For example, the second seal component 20 may be generally C-shaped in cross section with a pair of flanged portions 28 and 29 having spaced apart ends 32 and 34, respectively forming an elongated gap or opening 36 of an elongated channel 38 is configured to removably receive the enlarged distal portion 24 of the first seal component 15. The channel 38 forms a second sealing surface 40. As discussed in more detail below, the flange portions 28 and 30 of the second seal component 20 are configured to clamp onto the enlarged distal portion 24 of the first seal component 15 when the airtight flexible membrane 2 is filled with pressurized gas. As also discussed in more detail below, as the internal pressure in space 4 (FIG. 1) of inflatable pressure structure 1 increases, the seal clamping force also increases, thereby ensuring that the pressure-assisted seal 10 does not leak as the internal pressure increases.

Referring again to FIG. 2, the pressure of air or other gases in internal space 4 of inflatable pressure structure 1 generates forces P1 and P3 acting on external surfaces 42A, 42B, and 42C of second seal component 20. The pressure also generates forces P2 acting on surface 44 of first seal component 15, and surface 46 of second seal component 20. The airtight flexible membrane 2 may experience forces "T1" and "T2" due to the pressure. The forces T1 and T2 may have a component acting opposite the direction of the outward pressure P1 (i.e. down in FIG. 2) that provide static equilibrium. The forces T1 and T2 generally act on airtight flexible membrane 2. Restraint layer 8 may be made of a high strength fabric having significantly less elasticity than membrane 6 such that restraint layer 8 carries significantly more loading than does internal bladder 6. The restraint layer 8 may be secured to seal components 15 and 20 utilizing suitable means such as mechanical fasteners and/or adhesives on surfaces 48 and 50 of seal components 15 and 20, respectively. As discussed in more detail, the inflatable pressure structure 1 preferably comprises a non-axisymmetric configuration whereby the forces T1 and T2 acting to open the pressure-assisted seal 10 are very low and more preferably zero or approximately zero. If the inflatable pressure structure 1 is configured in this way, the forces acting on pressure-assisted seal 10 due to internal pressure P are generally balanced by forces acting along the length of first and second seal components 15 and 20 (i.e. in a direction parallel to seal 10).

The first and second seal components 15 and 20, respectively, are preferably made from a flexible material that enables the inflatable pressure structure 1 to be collapsed into a very compact configuration. For example, the first seal component 15 may be made from a silicon coated vectran material and the second seal component 20 may be made from a similar or different material.

Referring again to FIG. 3, the enlarged distal portion 24 of first seal component 15 is preferably tubular, and forms an elongated cavity 52 extending along the first seal component 15. Sidewall 54 of enlarged distal portion 24 includes a U-shaped portion 56, and a flat portion 58 that may be substantially co-planar with flange 18, and formed integrally therewith. A groove or channel 60 in sidewall 54 forms an elongated buckling guide. As discussed above, when distal portion 24 is positioned in channel 38, pressure P inside inflatable pressure structure 1 causes second seal component 20 to clamp onto distal portion 24. The buckling guide 60 ensures that the sidewall 54 of distal portion 24 of first seal component 15 bends or collapses at the buckling guide 60 as the second seal component 20 is inserted and subsequently clamped by the distal end 24, thereby ensuring that the first sealing surface 26 of first seal component 15 remains in tight, sealing contact with second seal surface 40.

Figure 3:
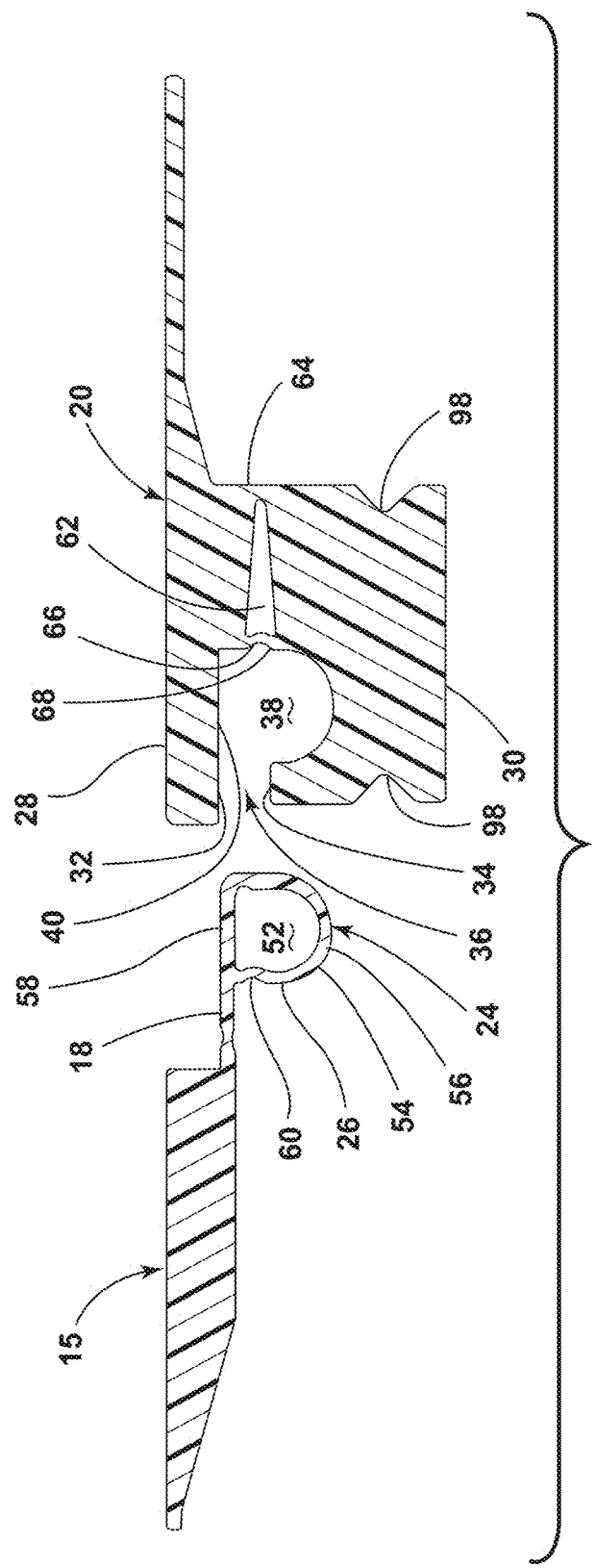
FIG. 3 is an exploded cross-sectional view of the pressure-assisted seal of FIG. 2.

The second seal component 20 includes an elongated passageway 62 and a living hinge 64 (FIG. 3). The living hinge 64 is preferably integrally formed with the flange portions 28 and 30 of second seal component 20. A sidewall 66 adjacent channel 38 closes off passageway 62. Sidewall 66 includes a groove or buckling guide 68 that reduces a force required to pivot the flange portions 28 and 30 about living hinge 64.

Figure 4:
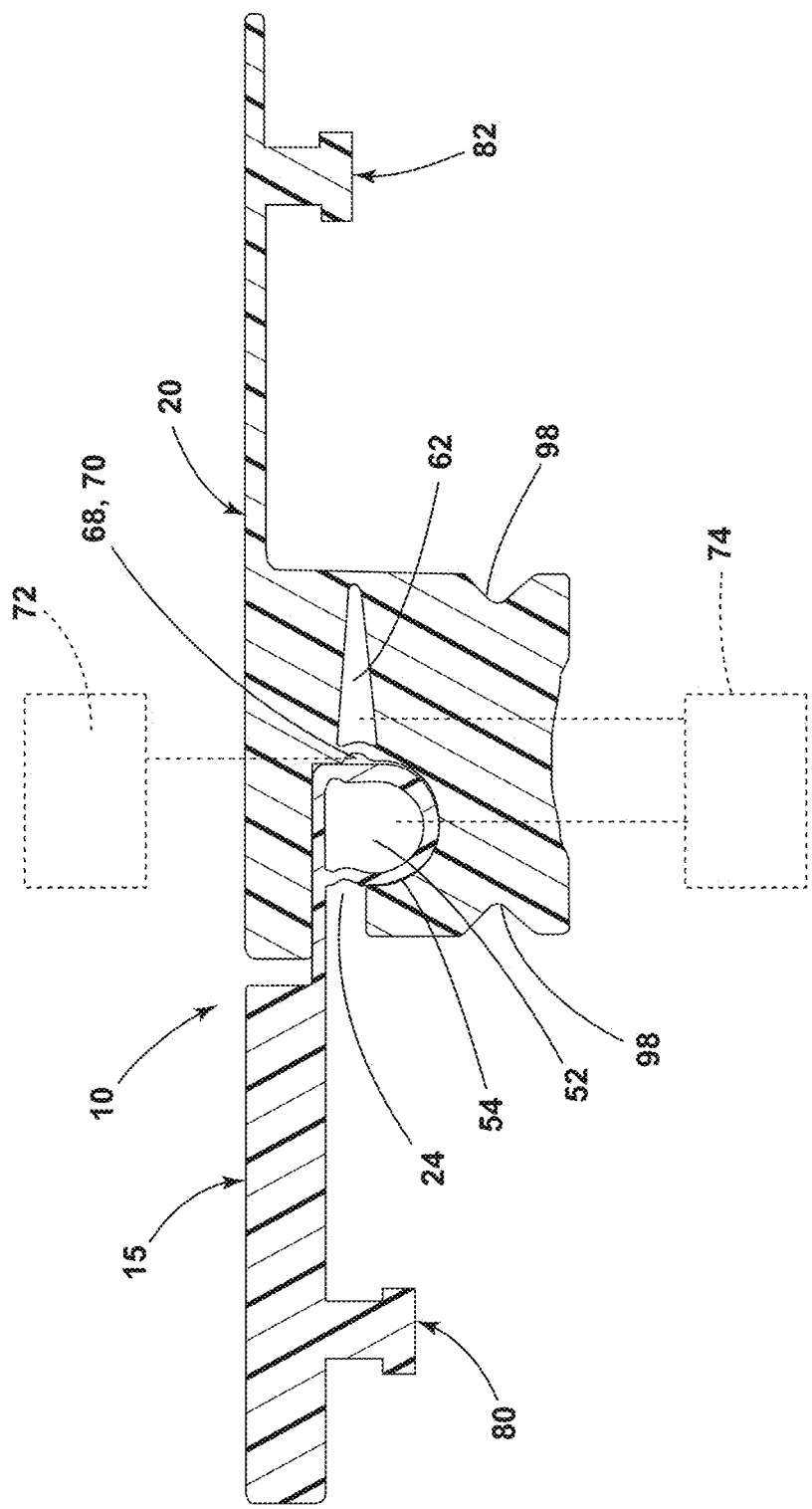
FIG. 4 is a cross-sectional view of a pressure-assisted seal according to another aspect of the present disclosure.

With further reference to FIG. 4, when the pressure-assisted seal 10 is in a sealed configuration, the groove 68 forms an elongated test port or passageway 70 that is closed off by the sidewall 54 of enlarged distal end 24 of first seal component 15. An optional air supply and testing system 72 may be operably connected to the test port 70. The air supply and testing system 72 may introduce pressurized air into the test port 70, and may include one or more sensors that measure the air pressure in test port 70. If the first and second seal components 15 and 20 are properly sealed, pressure or vacuum in test port 70 is maintained, and testing unit 72 can thereby determine that a proper seal has been formed. Alternatively, if air or other gas escapes from or into test port 70, the test unit 72 can determine that a leak is present, and a proper seal is therefore not present between the first and second seal components 15 and 20. The test port 70 and test unit 72 may be utilized to test the seal of pressure-assisted seal 10 prior to inflating inflatable pressure structure 1 and/or to monitor the seal during or after inflation.

As shown in FIG. 4, elongated cavity 52 of first seal component 15 and/or passageway 62 of second seal component 20 may be optionally operably connected to a heating unit 74. The heating unit 74 may be configured to circulate heated air or other gas through the passageways 52 and 62 to thereby heat the first and second seal components 15 and 20 to ensure that the materials of the first and second seal components 15 and 20 do not harden or become excessively cool. For example, the operational conditions (e.g. temperature) of the pressure-assisted seal 10 may be monitored, and the temperature and/or quantity of air circulated through passageway 52 and/or passageway 62 may be monitored and controlled to maintain flexibility under cold temperatures or to allow increased stiffness of selected portions of the seal components 15 and 20 as may be required for a particular application.

Figure 2:
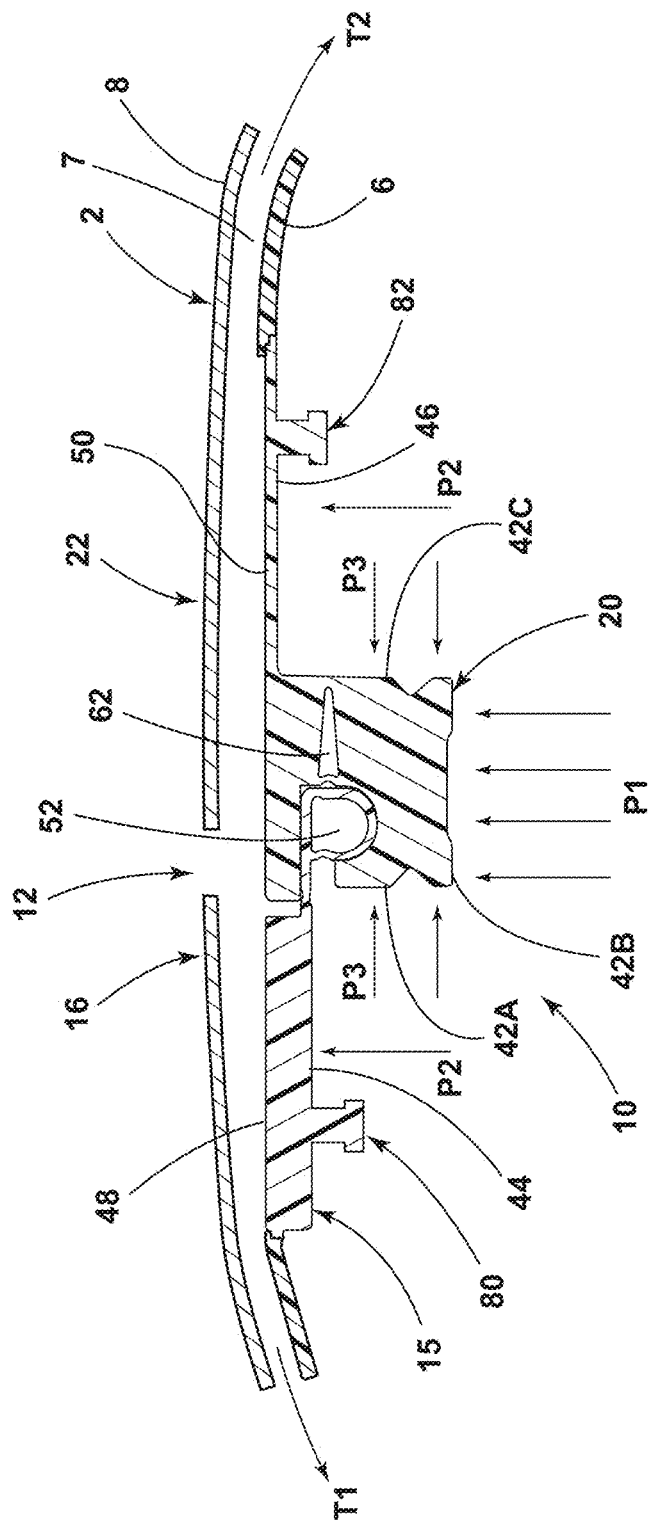
FIG. 2 is an enlarged view of a portion of the inflatable pressure structure of FIG. 1.

As shown in FIGS. 2 and 4, first and second seal components 15 and 20 may optionally include insertion and removal aids 80 and 82. The insertion aids 80 and 82 may comprise integrally formed protrusions extending along the first and second seal components 15 and 20, respectively. The insertion aids 80 and 82 may be configured to provide gripping surfaces that can be used by a tool or an individual to assist engaging and disengaging first and second seal components 15 and 20.

Figure 5:
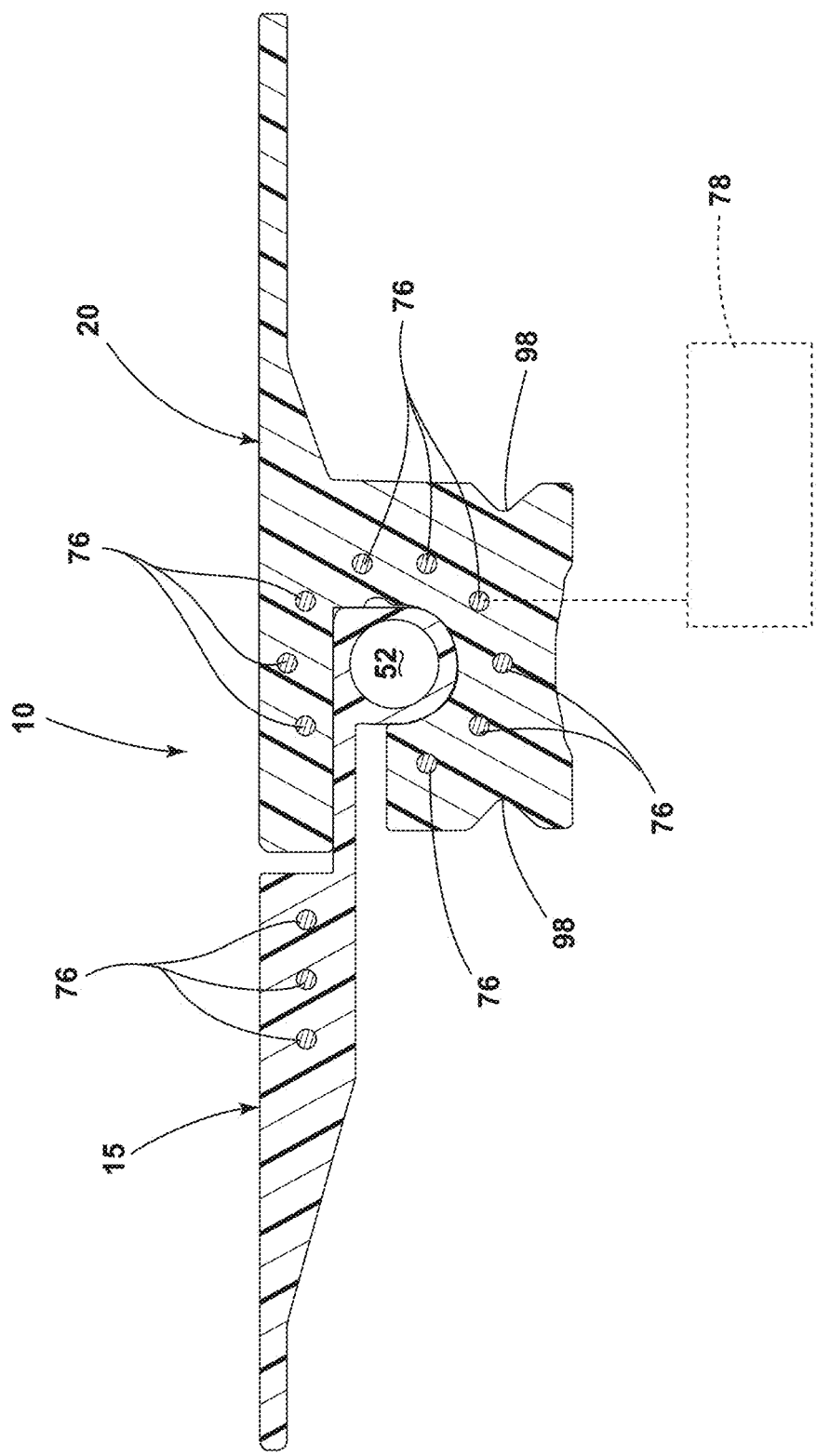
FIG. 5 is a cross-sectional view of a pressure-assisted seal according to another aspect of the present disclosure.

With further reference to FIG. 5, resistance heating elements (e.g. wires) 76 may be embedded in first seal component 15 and/or second seal component 20. The resistance heating elements 76 may extend along the first and second seal components 15 and 20. The resistance heating elements 76 may be operably connected to an electrical power source 78 that may be configured to control the electric current in the individual resistance heating elements 76 as required to maintain flexibility of the first seal component 15 and second seal component 20 and/or to provide a desired degree of stiffness. Heating elements may also be embedded in first seal component 15 to heat the material forming cavity 52 and gas or fluid disposed in cavity 52.

Figure 6:
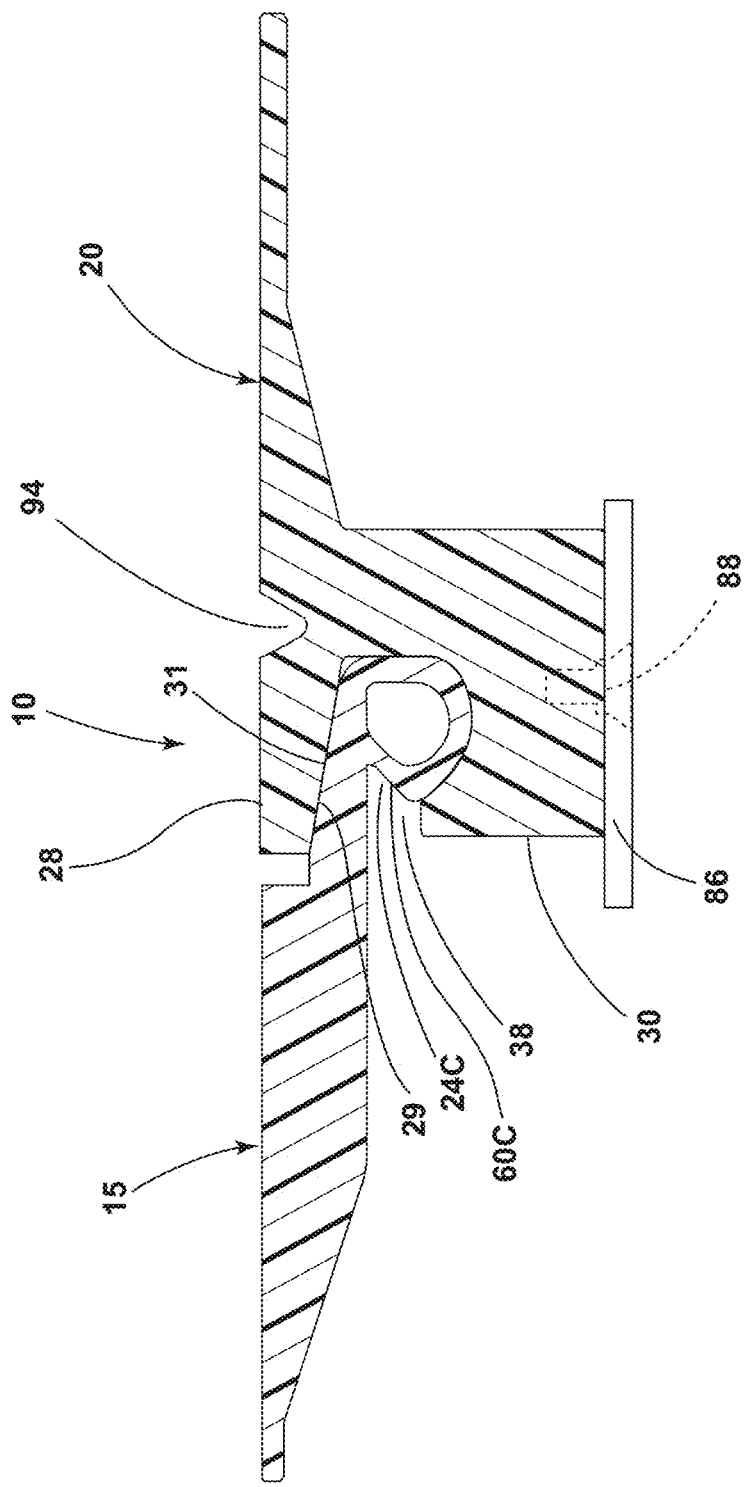
FIG. 6 is a cross-sectional view of a pressure-assisted seal according to another aspect of the present disclosure.
Figure 7:
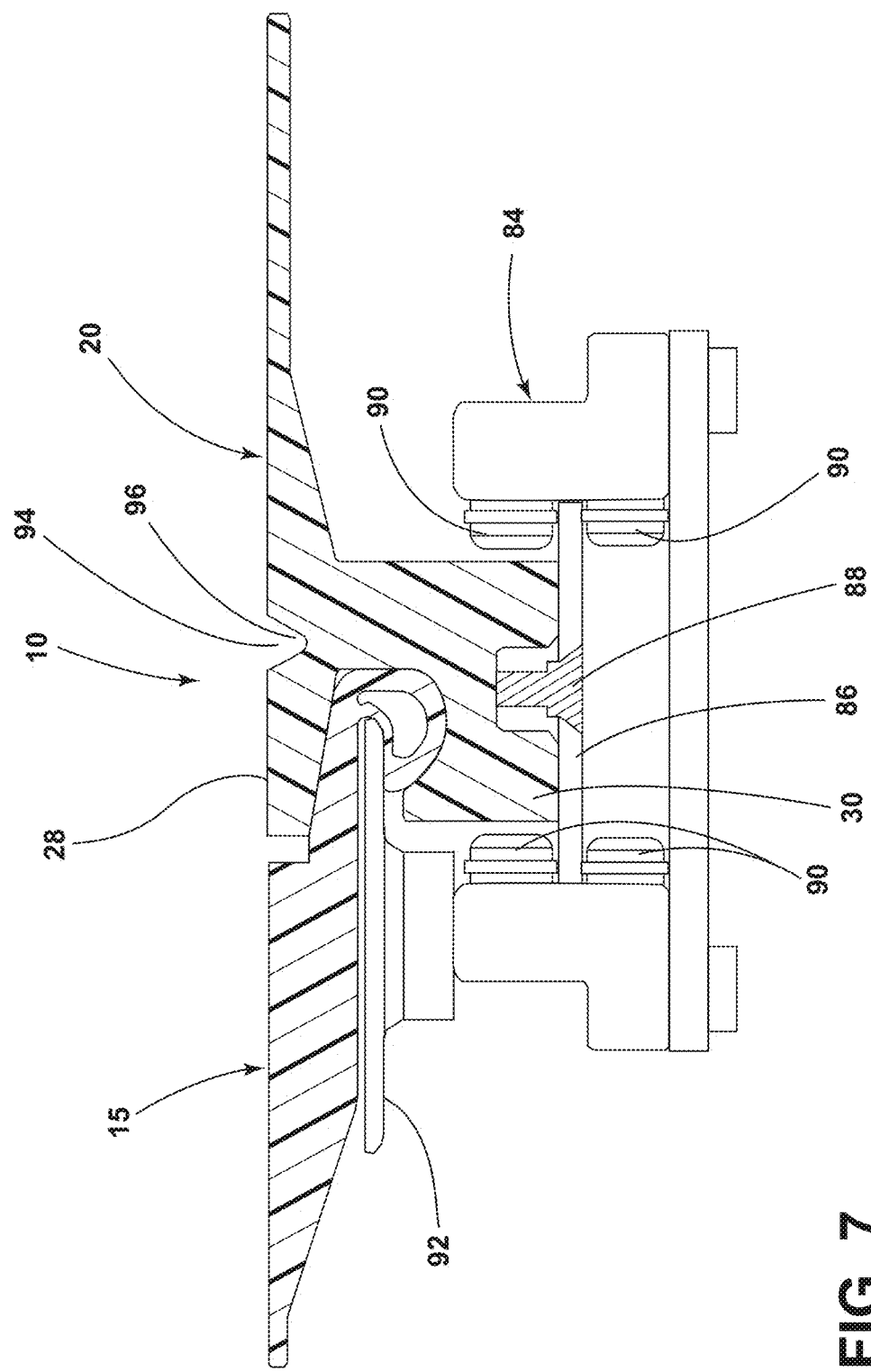
FIG. 7 is a cross-sectional view of a pressure-assisted seal and slider according to another aspect of the pressure disclosure.

With further reference to FIGS. 6 and 7, a slide unit 84 may be utilized to insert distal portion 24 of first seal component 15 into channel 38 of second seal component 20. A track guide 86 may be secured to second seal component 20 by fasteners 88 or other suitable means. Rollers 90 of sliding unit 84 movably engages the track guide 86 to thereby retain the sliding unit 84 at a desired position as the sliding unit 84 moves along the pressure-assisted seal 10. A guide such as tuck wheel 92 is configured to push the distal portion 24 of first seal component 15 into channel 38 of second seal component 20 as the sliding unit 84 is moved along the pressure-assisted seal 10 to thereby interconnect the first and second seal components 15 and 20. The second seal component 20 of FIGS. 6 and 7 may include a groove 94 forming a hinge to permit movement of flange portions 28 and 30 about the hinge 96. Referring again to FIGS. 4 and 5, second seal component 20 may include V-grooves 98 forming track guides that are engaged by rollers of a slide unit having rollers 90 (FIG. 7) that are configured to engage the V-grooves 98.

With further reference to FIGS. 8 and 9, an end 100 of pressure-assisted seal 10 may include an overmolded material 102. Overmolded material 102 may comprise a polymer or other suitable material that terminates the opposite ends of pressure-assisted seal 10. The overmolded material 102 provides a uniform bonding surface 104 that can be bonded to the internal bladder 6 via adhesives or other suitable means. In general, the ends 100 of the pressure-assisted seal 10 are high stress regions, and the overmold material 102 can be tapered in the region 106 to increase the thickness "T" of the bonded material 102 in these regions to improve overall seal robustness. The overmolded material 102 also provides a structurally efficient way to integrate air fittings 108, and/or heating elements 76 to control seal temperature. The elongated seal components 15 and 20 may be extruded, and the ends 100 may then be overmolded with overmold material 102 to retain the ends 100 in a sealed configuration at the ends 100.

Silicone, urethane, or other similar materials may be utilized to coat internal bladder 6. The first and second seal components 15 and 20 may be extruded from silicone, urethane, or other suitable materials. This enables the seal components 15 and 20 to be directly bonded to an internal bladder 6, thereby providing a flexible structure that does not require heavy rigid interface structures.

Figure 10:
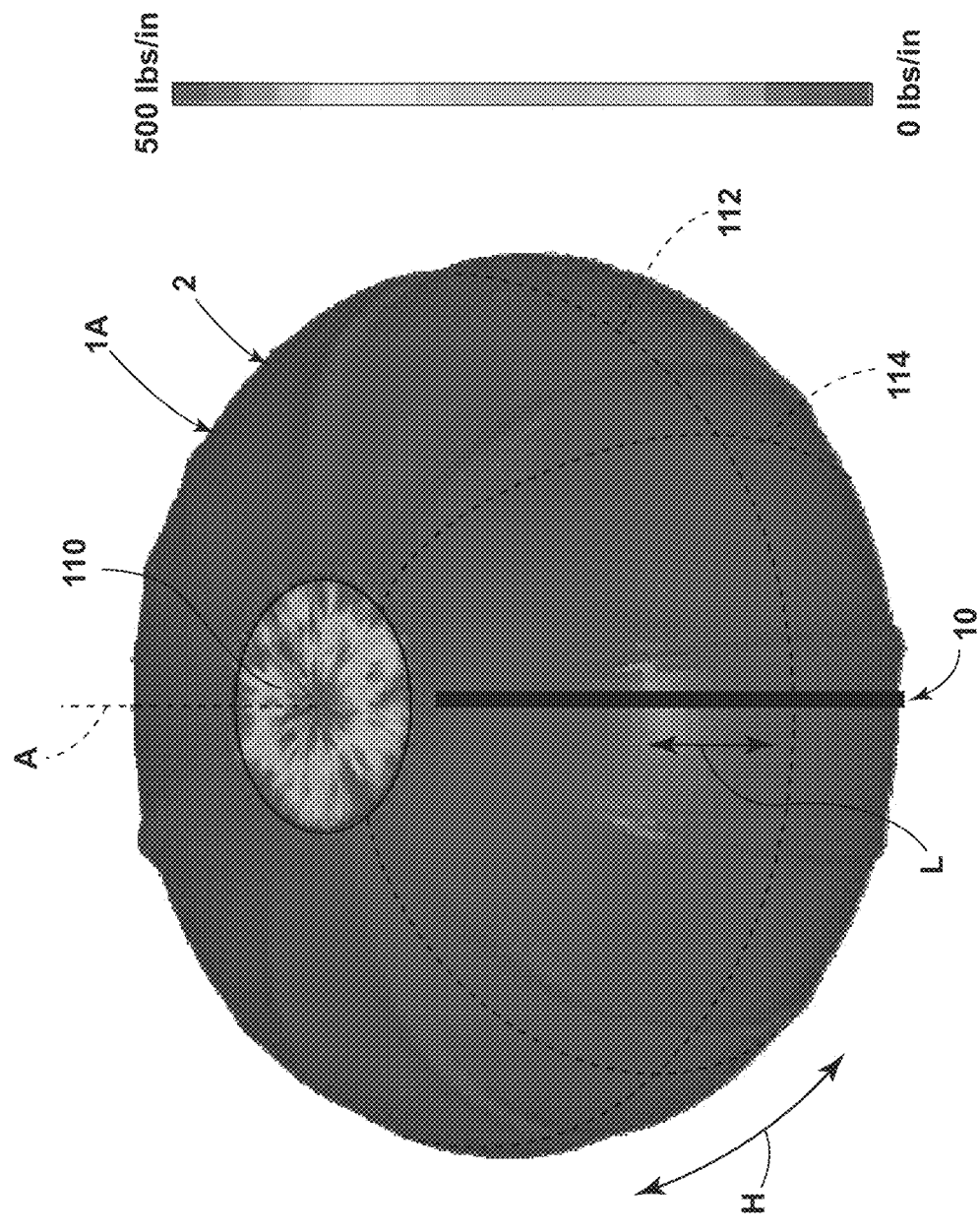
FIG. 10 is a computer-generated image showing stress levels in an inflatable structure low hoop stress shape.

With further reference to FIG. 10, an inflatable pressure structure 1A has a shape that has a relatively low hoop stress or load "H" when inflated. The inflatable pressure structure 1A includes poles 110 and an equatorial line 112 corresponding to an equatorial plane extending perpendicular to the axis A. The structure 1A is substantially symmetric about the axis A. Pressure-assisted seal 10 may be positioned such that the pressure-assisted seal 10 extends transverse to the equatorial line 12 along a meridian line 114. A distance between the poles 110 is significantly less than a diameter of the structure 1A at the equatorial line or plane 112. The shape of structure 1A is selected to provide a very low or near zero hoop stress or load H. Thus, the structure 1A produces very little stress or force tending to open pressure-assisted seal 10. In general, the stresses "L" acting parallel to pressure-assisted seal 10 are much higher than the hoop stresses or loads H. It will be understood that the hoop stresses or loads H may be zero or very low depending upon the shape of inflatable pressure structure 1A.

Figure 11:
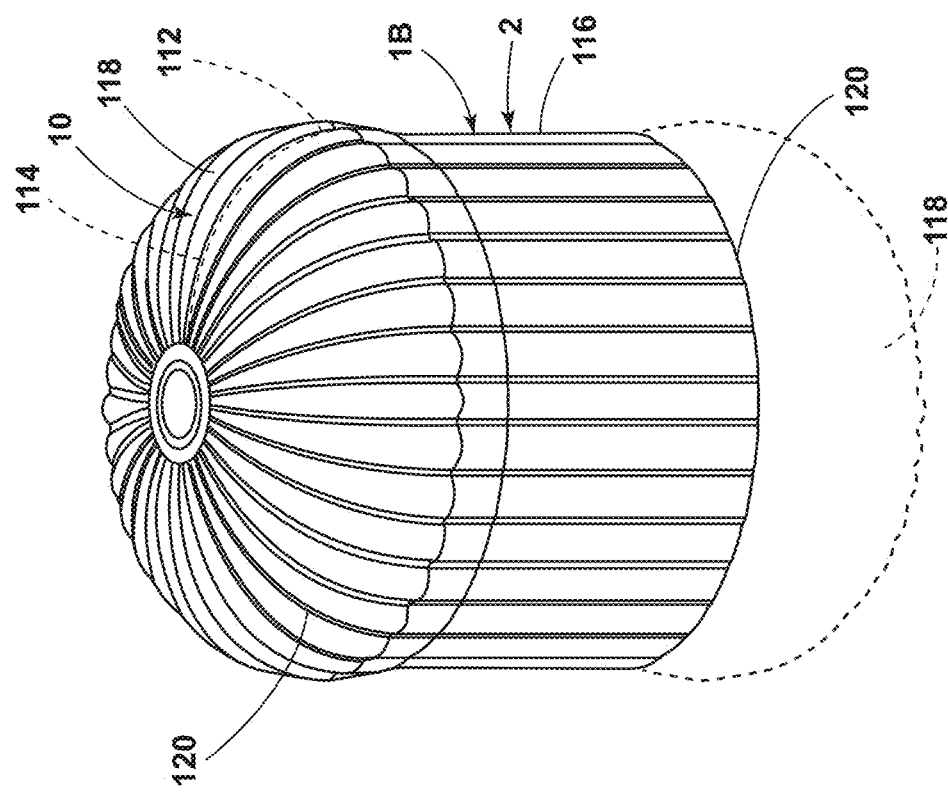
FIG. 11 is a partially fragmentary isometric view of a portion of an inflatable pressure structure having an equatorial cut low hoop stress dome.

With further reference to FIG. 11, an inflatable pressure structure 1B may include a cylindrical portion 116, and an end dome 118. End dome 118 may have a shape that is substantially similar to one-half of the structure 1A (FIG. 10), wherein dome 118 is "cut" along equatorial line 112 and joined to cylindrical portion 116. It will be understood that the equatorial line 112 shown in FIG. 11 may not comprise an actual seam or joint in the materials, but rather may signify a transition from cylindrical portion 116 to the dome 118. Also, as discussed in more detail below, one or more flexible lines, such as cord 120 may be attached to the structure 1B to provide reinforcement.

Figure 12:
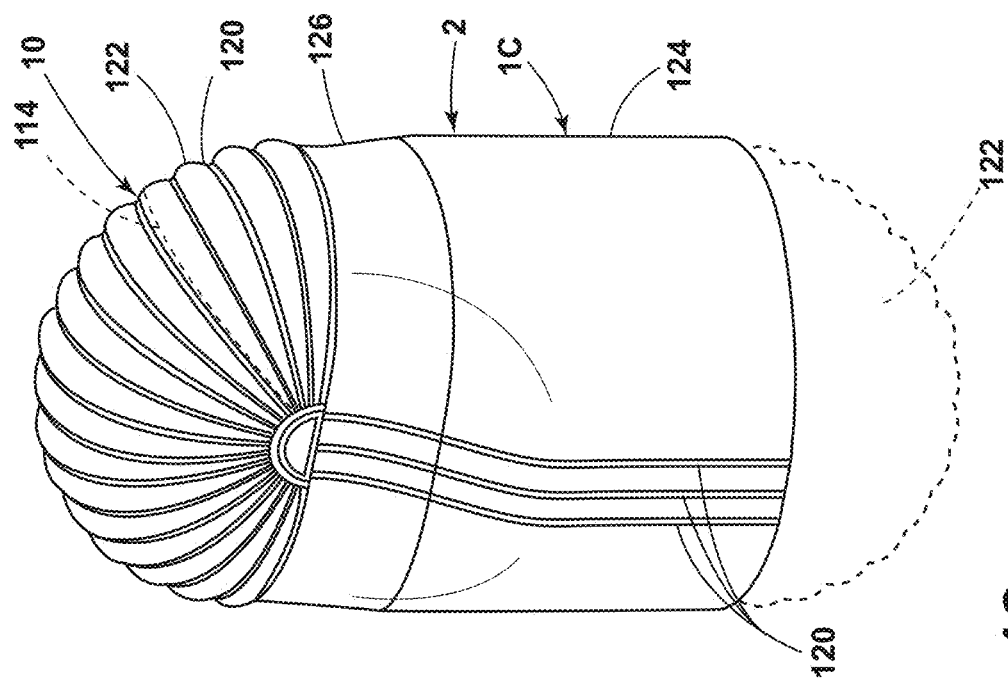
FIG. 12 is a partially fragmentary isometric view of a portion of an inflatable pressure structure having a polar cut low hoop stress dome.

With further reference to FIG. 12, a structure 1C may include an end dome 120 and a cylindrical portion 124 that is joined to the dome 122 by a transition portion 126. The end dome 122 may have a shape that is substantially similar to one-half of the structure 1A (FIG. 10), wherein the structure 1A has been "cut" along a meridian line 114 to form dome 122. Structure 1C may include one or more cords 120 to reinforce the structure 1C. A pressure-assisted seal 10 may be positioned to extend along a meridian line 114 such that the stresses (forces) tending to open the pressure-assisted seal 10 are zero or very low.

Figure 13:
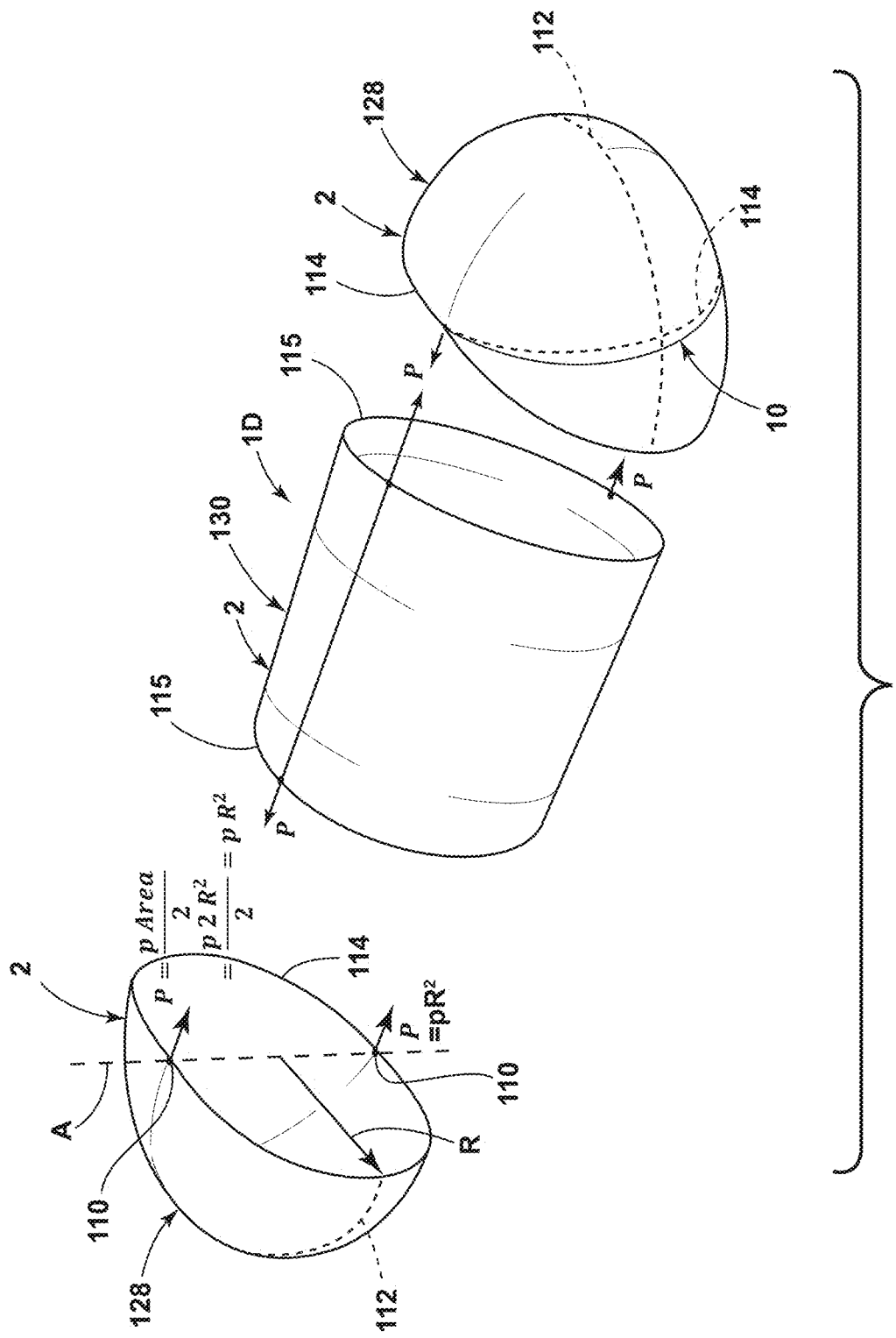
FIG. 13 is a partially schematic exploded isometric view of a non-axisymmetric inflatable pressure structure having a circumferentially wrapped mid-body cylinder and low hoop stress domes.

With further reference to FIG. 13, a non-axisymmetric inflatable pressure structure 1D includes end domes 128 that are attached to a circumferentially wrapped cylindrical center 130. Each dome 128 includes poles 110. An axis A extends through poles 110. The domes 128 may be shaped to provide zero or very low hoop stress. In particular, the forces "P" acting on the poles 110 are generally equal to one-half the pressure of the gas inside structure times the cross-sectional area divided by two, or the pressure times the radius "R" squared. The pressure-assisted seal 10 may be positioned along a meridian line 114 such that the forces tending to open the pressure-assisted seal are zero or very low. In addition, the axial stresses in cylindrical portion 130 are zero or very low and a linear seal may be placed along a circumferential line of cylindrical portion 130.

A structure 1E (FIG. 14) includes spherical domes 132 and a cylindrical center portion 134. The fabric stresses acting on the spherical domes 132 are approximately equal to one another. Although a pressure-assisted seal 10 could be utilized in the structure 1E, the structure 1E may not provide zero or near zero hoop stress, and the structure 1E is therefore less preferred.

In contrast to structure 1E, a structure 1F (FIG. 15) includes domes 136 that are substantially similar to the dome 118 (FIG. 11), and a cylindrical center portion 138. The structure 1F provides stresses $\sigma_{hd}$ that are approximately zero. Accordingly, a pressure-assisted seal 10 may be positioned along a meridian line 114, and the hoop stresses acting on pressure-assisted seal 10 will be zero or very low.

A structure 1G (FIG. 16) has substantially the same configuration as structure 1D (FIG. 13), and includes a cylindrical center portion 142 and domes 140. A pressure-assisted seal 10 may be positioned along a meridian line 114 such that the hoop stresses (forces) tending to open pressure-assisted seal 10 are zero or very low. In addition, the stresses $\sigma_a$ in 142 are zero or very low and linear seals maybe placed in cylindrical center portion 142 along lines transverse (e.g. orthogonal) to the direction of the primary load P.

Figure 17:
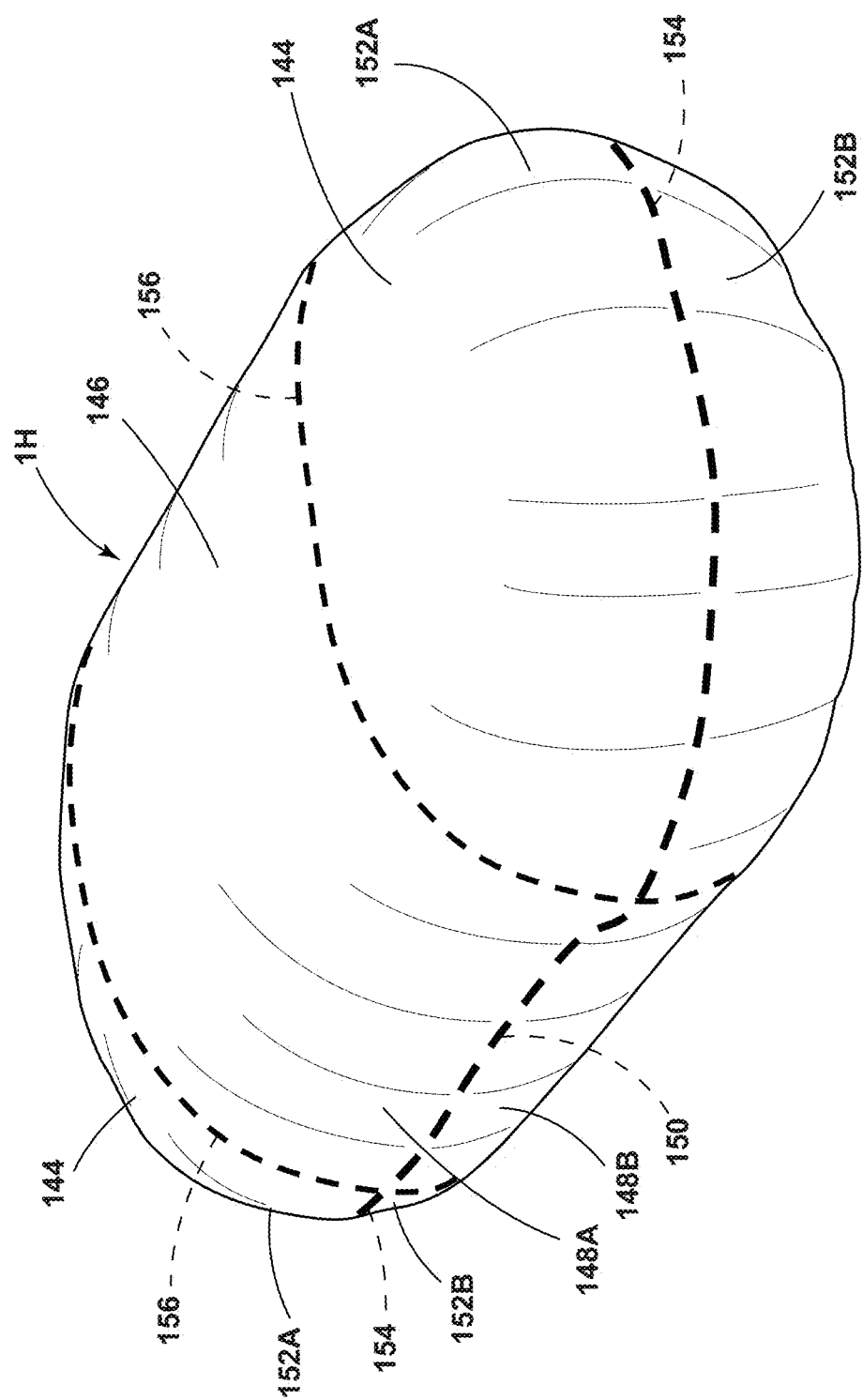
FIG. 17 is an isometric view of a non-axisymmetric inflatable pressure structure in an inflated configuration.

With further reference to FIG. 17, an inflatable pressure structure 1H having domes 144 and a cylindrical center portion 146 may have substantially the same configuration as structure 1G (FIG. 16). The structure 1H may be formed from a plurality of individual pieces of material. For example, the cylindrical center portion 146 may be formed from a pair of flat pieces of material 148A and 148B that are joined along seams 150. Similarly, domes 144 may be made from flat pieces of material 152A and 152B that are joined along seam 154. The domes 144 may be joined to the cylindrical center portion 146 along seams 156. It will be understood that the inflatable pressure structure 1H may comprise an internal bladder 6, a restraint layer 8.

Figure 18A:
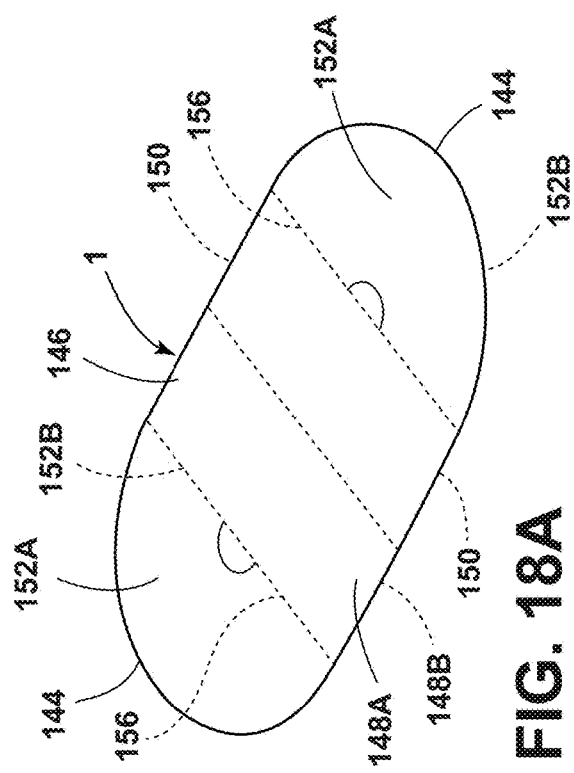
FIG. 18A is a partially isometric view of a non-axisymmetric inflatable pressure structure showing the initial flat sheets in a completely collapsed or deflated configuration.
Figure 18B:
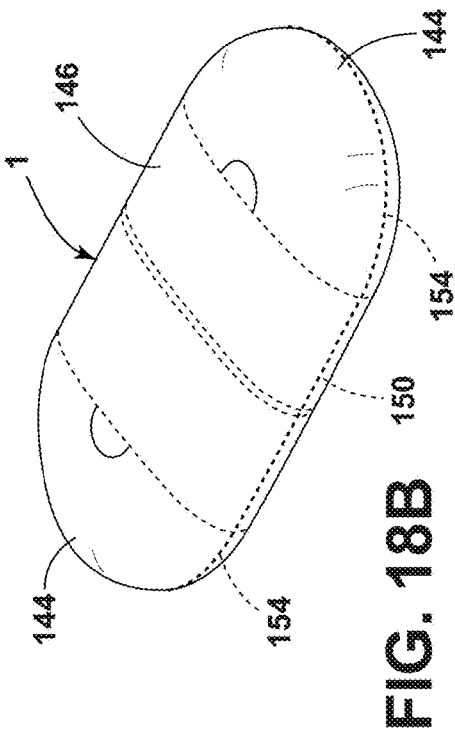
FIG. 18B is the non-axisymmetric inflatable pressure structure of FIG. 18 in a first partial pressurization state.
Figure 18C:
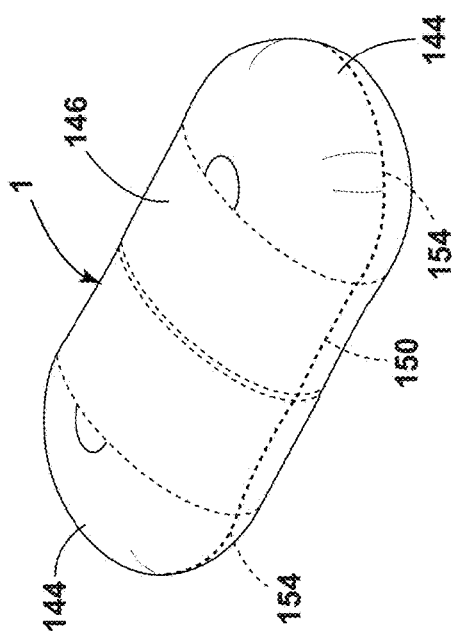
FIG. 18C is the non-axisymmetric inflatable pressure structure of FIG. 18 in a second partial pressurization state.
Figure 18D:
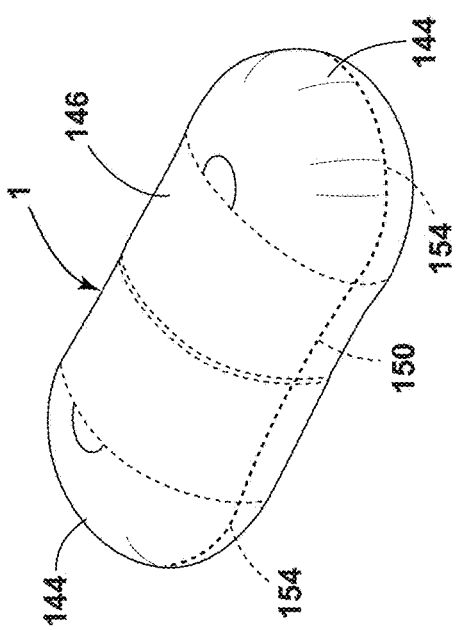
FIG. 18D is the non-axisymmetric inflatable pressure structure of FIG. 18 in a full pressurization state.

With further reference to FIGS. 18A-18D, inflatable pressure structure 1 may be shifted or transformed from a fully collapsed, flat configuration (FIG. 18A), folded or rolled configuration, to a fully inflated configuration (FIG. 18D). More specifically, as air or other gas is introduced into internal space 4 of inflatable pressure structure 1, the structure 1 initially changes from a flat configuration (FIG. 18A) to a first partially pressurization configuration (FIG. 18B). As additional air or other gas is introduced into the internal space 4, the structure 1 further changes to a second partially pressurized configuration (FIG. 18C). After additional air or gas is introduced into the internal space 4, the inflatable pressure structure 1 reaches a full pressurization configuration (FIG. 18D).

Figure 19:
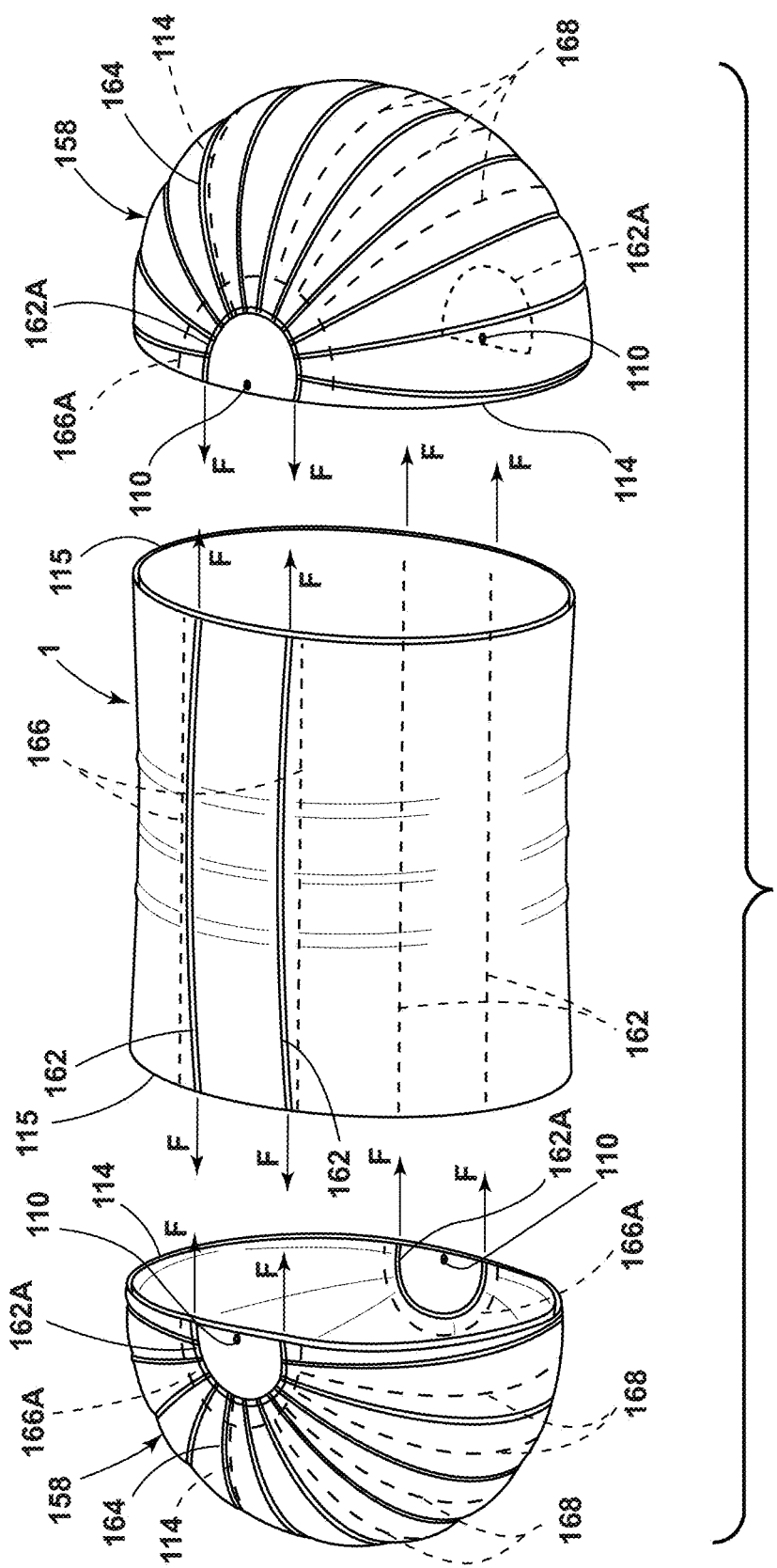
FIG. 19 is a partially schematic exploded isometric view of a non-axisymmetric inflatable pressure structure according to one aspect of the present disclosure, wherein the pressure structure includes restraint cords.

With further reference to FIG. 19, inflatable pressure structure 1 may have a shape that is substantially similar to the structures 1D (FIG. 13) or 1G (FIG. 16), including domes 158 and a cylindrical central portion 160. The inflatable pressure structure 1 of FIG. 19 includes restraint cords 162 extending along cylindrical central portion 160. Additional restraint cords maybe added transverse to 162 in the central portion 160 to improve performance or redundancy. The cords 162 include end portions 162A that extend around poles 110 of domes 158. The ends 162A are connected to a plurality of meridian restraint cords 164 that extend along meridian lines 114 of domes 158. The restraint cords 162 and 164 carry tension forces "F" to reduce the stresses on internal bladder 6 and/or restraint layer 8.

Structure 1 may optionally include additional restraint cords 166 having ends 166A that are connected to additional meridian restraint cords 168. The additional restraint cords 166 and meridian restraint cords 168 provide redundant reinforcement. The restraint cords 162, 164, 166 and 168 may configured to provide, together, at least twice the total strength required during normal conditions. In the event one of the restraint cords breaks, the additional strength provided by the redundant restraint cords ensures that the structure 1 does not fail.

Figure 20:
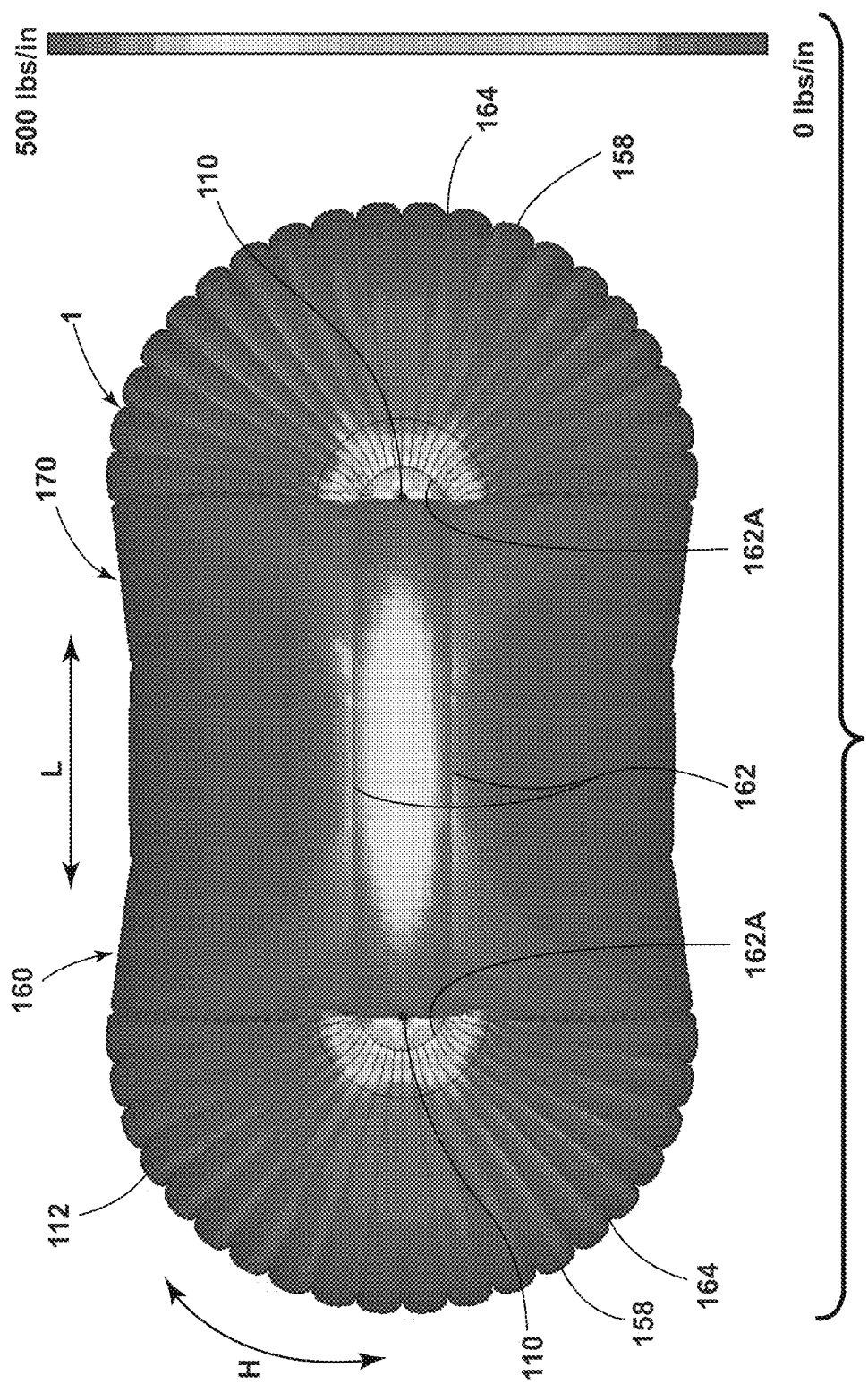
FIG. 20 is a Finite Element Model (FEM) image showing stresses in a non-axisymmetric inflatable pressure structure.

With further reference to FIG. 20, an FEM model 170 of a structure 1 having a non-asymmetric configuration shows that the hoop loads H at the equators 112 of domes 158 are zero or very low. The axial load "L" is also relatively low. In general, the highest stresses are at or adjacent the poles 110 of domes 158.

Figure 21:
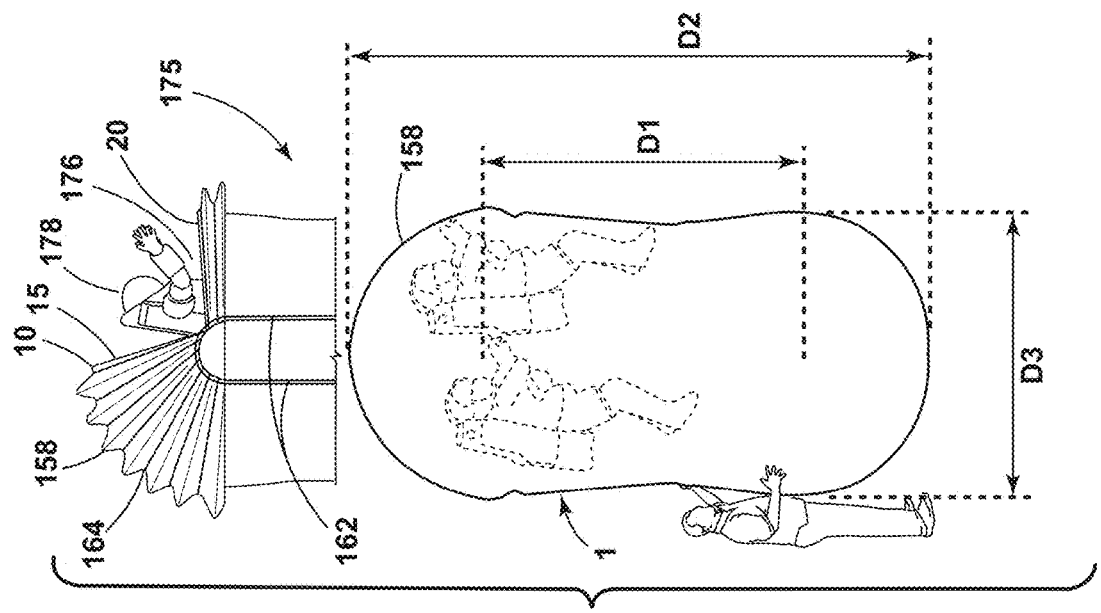
FIG. 21 is a partially schematic view of an airlock for a space vehicle according to one aspect of the present disclosure.

With further reference to FIG. 21, an airlock 175 for use in a spacecraft or the like comprises an inflatable pressure structure 1 having a dome 158 including a pressure-assisted seal 10 with first and second seal components 15 and 20 that may be separated to form an enlarged opening 176 to permit an astronaut 178 to exit through the opening 176. In the illustrated example, the airlock 175 has a first dimension D1 of about 2.1 meters, a second dimension D2 of about 4.4 meters, and a third dimension D3 of about 2.3 meters. It will be understood that the airlock 175 may have virtually any size as required for a particular application.

Figure 22:
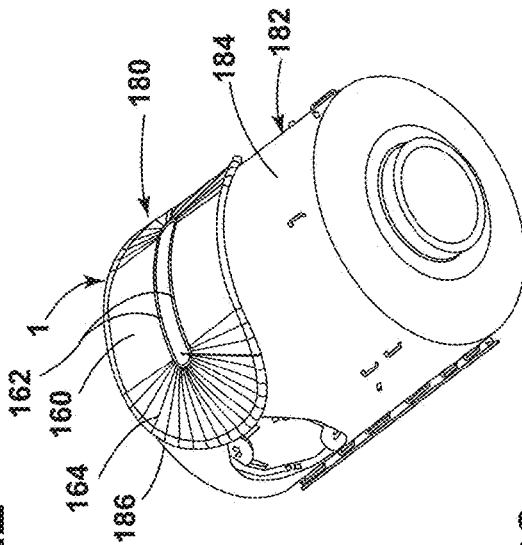
FIG. 22 is an isometric view of a spacecraft and airlock according to one aspect of the present disclosure, wherein the airlock is in an inflated configuration.
Figure 23:
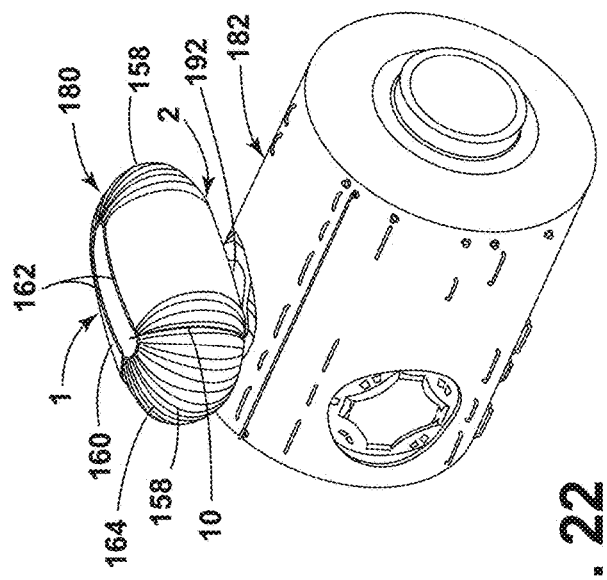
FIG. 23 shows the airlock of FIG. 22 in a collapsed or stored configuration.

With further reference to FIGS. 22 and 23, an airlock 180 may comprise an inflatable pressure structure 1 having domes 158 and a generally cylindrical central portion 160. One or both domes 158 include a pressure-assisted seal 10 extending along a meridian line. The airlock 180 may be secured to a spacecraft 182. The airlock 180 may be deflated to a collapsed configuration (FIG. 23) during launch. When the airlock 180 (inflatable pressure structure 1) is in the collapsed or deflated configuration (FIG. 23), the inflatable pressure structure 1 fits closely against curved outer surface 184 of spacecraft 182 to thereby minimize the space required for airlock 180 during launch. As discussed above, the inflatable pressure structure 1, including pressure-assisted seal 10, may be made of flexible materials. This permits the inflatable pressure structure 1 to collapse to a very thin configuration as shown in FIG. 23. When spacecraft 182 is outside the earth's atmosphere, the inflatable pressure structure 1 of airlock 180 may be inflated as shown in FIG. 22, an astronaut may then exit through the pressure-assisted seal 10.

Figure 24:
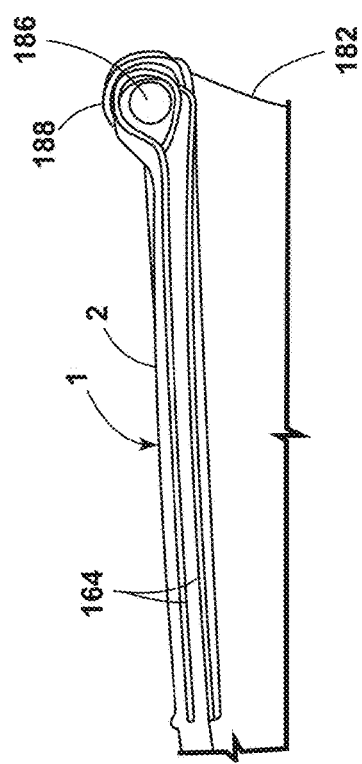
FIG. 24 is a partially fragmentary cross-sectional view of a portion of the airlock of FIGS. 22 and 23 showing a support tube.

With further reference to FIG. 24, the inflatable pressure structure 1 may include a support tube 186 (see also FIG. 23) that extends around a perimeter 188 of inflatable pressure structure 1. The support tube 186 is somewhat flexible to permit the inflatable pressure structure 1 to fit closely against curved outer surface 184 of spacecraft 182 as shown in FIG. 23. However, the support tube 186 preferably has sufficient rigidity to prevent the softgoods materials 188 from bending to sharply and can also ensure that the inflatable pressure structure 1 does not fold over onto itself, but rather retains a flat configuration when deflated as shown in FIGS. 23 and 24.

Figure 26:
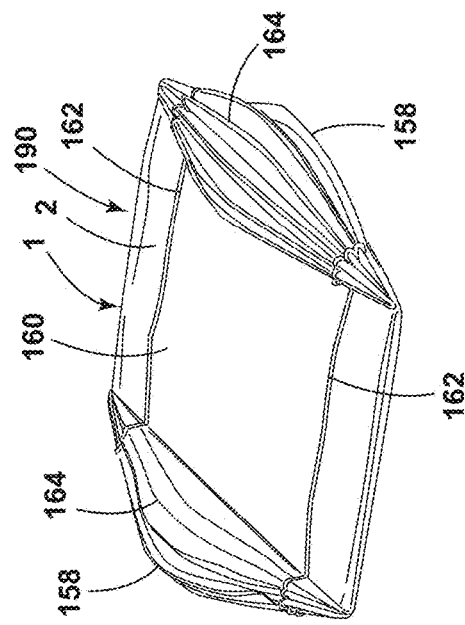
FIG. 26 shows an airlock in a collapsed or deflated configuration.
Figure 27:
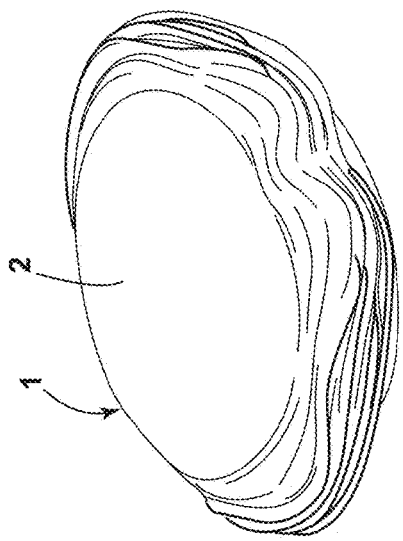
FIG. 27 shows an airlock in a collapsed or deflated configuration.
Figure 25:
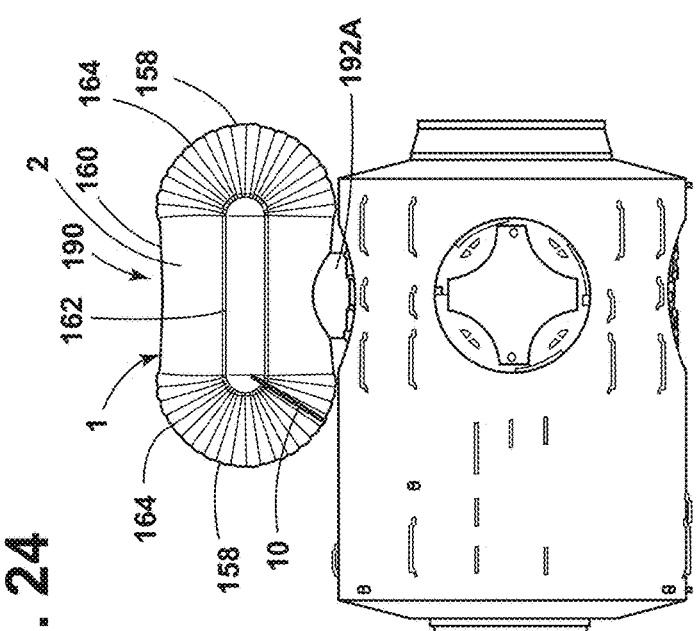
FIG. 25 is a partially schematic view of a spacecraft and airlock according to another aspect of the present disclosure showing the airlock in an inflated configuration.

With further reference to FIG. 25, an airlock 190 according to another aspect of the present disclosure may include an inflatable pressure structure 1 having a cylindrical central portion 160 and domes 158. The shape of airlock 190 is somewhat similar to the shape of airlock 180 (FIGS. 22 and 23). However, the airlock 190 includes an inflatable pressure structure 1 that is oriented orthogonally relative to the airlock 180, such that a transfer structure 192 is connected to a side of inflatable pressure structure 1 that is 90° relative to the restraint cords 162. The airlock 190 may be configured to collapse as shown in FIG. 26. Alternatively, the inflatable pressure structure 1 may be configured to collapse as shown in FIG. 27.

Figure 28:
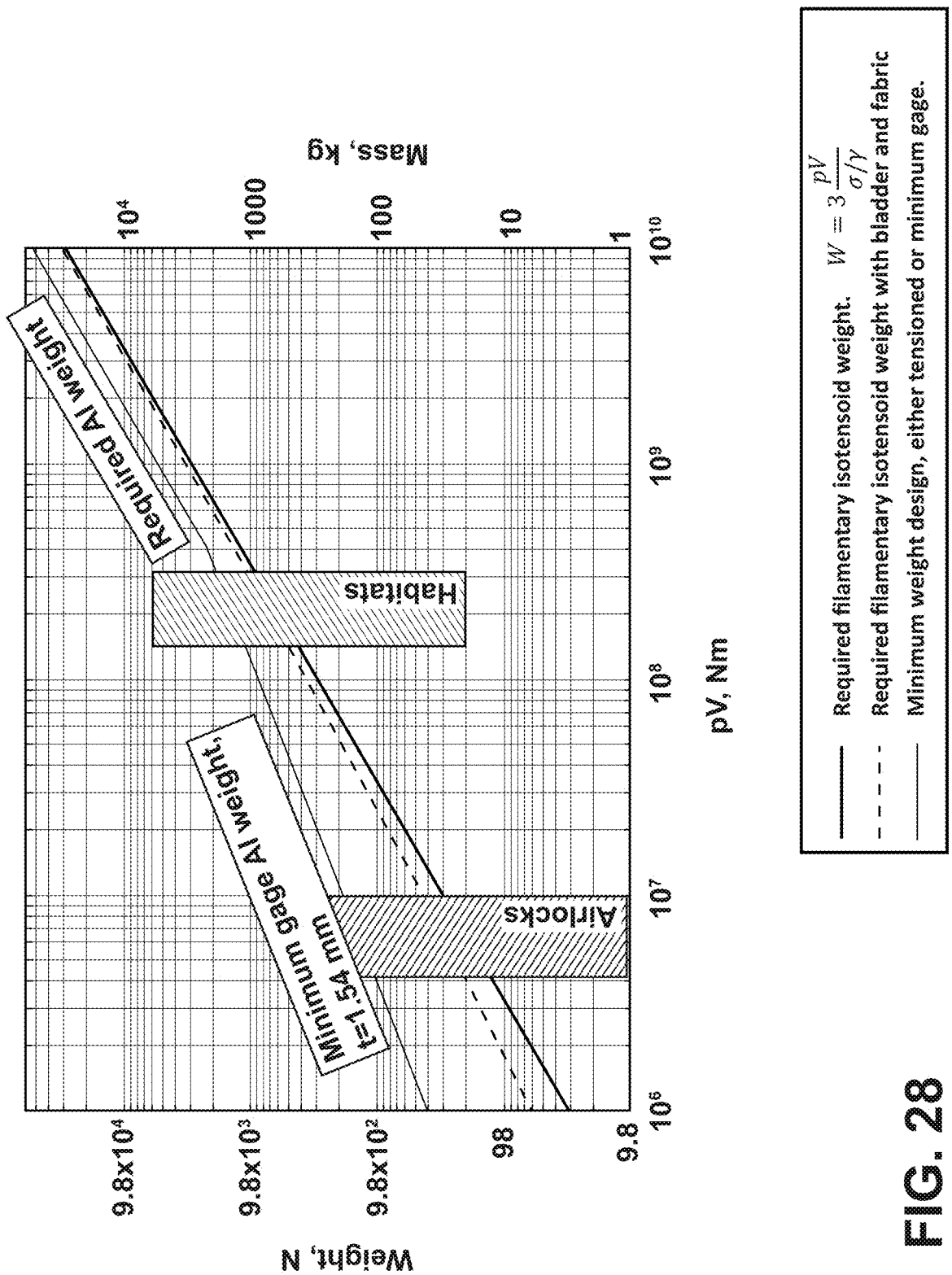
FIG. 28 is a chart showing weight and mass efficiency for various inflatable structures.

With further reference to FIG. 28, a primary benefit of an inflatable pressure structure 1 according to the present disclosure is packaging versatility. However, the inflatable pressure structure 1 also has potential to reduce weight relative to rigid pressure vessels or structures. Furthermore, the inflatable pressure structure 1 is scalable from small pressure vessels, such as airlocks, to large structures, such as habitats suitable for use in space environments.

What is claimed is:
1. An inflatable pressure structure, comprising:
an airtight flexible membrane that is configured to change from a collapsed configuration when evacuated to an inflated configuration when filled with pressurized gas, the flexible membrane including elongated first and second edge portions that can be spaced apart to form an opening;
an elongated pressure-assisted seal including an elongated flexible first seal component extending along the first edge portion, and an elongated flexible second seal component extending along the second edge portion;
wherein the first seal component comprises a flange and an enlarged distal portion forming a first sealing surface;
wherein the second seal component has an open cross-sectional shape with a pair of flange portions forming an elongated channel that is configured to removably receive the enlarged distal portion of the first seal component, the channel forming a second sealing surface; and wherein the flange portions of the second seal components are configured to clamp onto the enlarged distal portion when the airtight flexible membrane is filled with pressurized gas.

2. The inflatable pressure structure of claim 1, wherein:
the airtight flexible membrane, when inflated, includes at least one region having orthogonal larger and smaller principle stresses, and in which a ratio of the larger principle stress to the smaller principle stress is at least about 10; and
the elongated seal is located in at least one region.

3. The inflatable pressure structure of claim 2, wherein:
the smaller principle stress is transverse to the elongated seal.

4. The inflatable pressure structure of claim 1, wherein:
a flexible fabric restraint layer positioned around the airtight flexible membrane.

5. The inflatable pressure structure of claim 1, wherein:
the enlarged distal portion of the first seal component is tubular and forms an elongated internal passageway.

6. The inflatable pressure structure of claim 5, wherein:
the enlarged distal portion comprises a flexible material, and includes a sidewall having an elongated buckling guide along which the sidewall buckles when the flange portions at the second seal component clamp onto the enlarged distal portion.

7. The inflatable pressure structure of claim 5, wherein:
the enlarged distal portion includes a sidewall extending around the passageway, the sidewall including a portion that is U-shaped in cross section, and a flat portion that is substantially co-planar with the flange and closes off the U-shaped portion.

8. The inflatable pressure structure of claim 7, wherein:
the elongated channel of the second seal component includes a substantially flat surface portion that is configured to fit closely against the flat portion of the sidewall of the enlarged distal portion, and a concave surface portion that is configured to fit closely against the U-shaped portion of the sidewall of the enlarged distal portion.

9. The inflatable pressure structure of claim 8, wherein:
the second seal component is generally C-shaped in cross-section, and includes an integral living hinge interconnecting the flange portions of the second seal component.

10. The inflatable pressure structure of claim 9, wherein:
the second seal component including an elongated hinge passageway extending parallel to the living hinge, and a flexible sidewall portion having a first side facing the elongated channel and a second side facing the living hinge.

11. The inflatable pressure structure of claim 10, wherein:
the flexible sidewall portion includes a groove facing the enlarged distal portion of the first seal component when the enlarged distal portion is disposed in the elongated channel to form an elongated test port; and including:
at least one sensor configured to determine if the test port is airtight.

12. The inflatable pressure structure of claim 1, including:
heating elements extending along at least one of the first seal component and the second seal component.

13. The inflatable pressure structure of claim 1, including:
a slider movably connected to the elongated pressure-assisted seal, wherein the slider is configured to move along the elongated pressure-assisted seal and insert the enlarged distal portion of the first seal component into the elongated channel of the second seal component.

14. An inflatable pressure structure, comprising:
an airtight flexible membrane having a non-axisymmetric shape when inflated, the airtight flexible membrane including at least one dome defining a central equatorial plane and an axis extending through opposite poles that are spaced apart a first dimension, and wherein a radius between the axis of the airtight flexible membrane at the equatorial plane is greater than the first dimension, whereby a base of the dome has an oblong shape, and wherein at least a portion of the dome of the airtight flexible membrane has a hoop stress in a direction transverse to the axis when the airtight flexible membrane is inflated, and a radial stress transverse to the hoop stress when the airtight flexible membrane is inflated, and wherein the radial stress is at least an order of magnitude greater than the hoop stress when the airtight flexible membrane is inflated, the airtight flexible membrane including an openable seam extending transverse to a direction of the hoop stress;
an elongated pressure-assisted linear seal releasably closing the openable seam, the elongated pressure-assisted linear seal including a first seal component having an enlarged distal portion, and a second seal component having an elongated channel that removably receives the enlarged distal portion, wherein the second seal component clamps onto the enlarged distal portion of the first seal component when the airtight flexible membrane is inflated to form a seal between the first seal component and the second seal component.

15. The inflatable pressure structure of claim 14, wherein:
the second seal component is C-shaped in cross section.

16. The inflatable pressure structure of claim 14, wherein:
at least one dome comprises a first dome, the airtight flexible membrane including a second dome and a central portion extending between and interconnecting the first and second seal domes, wherein the central portion is oblong in cross section when the airtight flexible membrane is inflated.

17. The inflatable pressure structure of claim 16, wherein:
at least one restraint cord forming an elongated hoop with first and second opposite ends, and wherein the first opposite end is attached to the first dome of the airtight flexible membrane, and the second opposite end is attached to the second dome of the airtight flexible membrane.

18. An inflatable pressure structure, comprising:
an airtight flexible membrane having collapsed and inflated configurations;
an elongated pressure-assisted seal having open and closed configurations, wherein the pressure-assisted seal is configured to selectively seal an opening in the airtight flexible membrane when the pressure-assisted seal is in the closed configuration;
wherein the pressure-assisted seal includes first and second seal components that sealingly engage one another and prevent escape of gas from inside the airtight flexible membrane through the pressure-assisted seal when the pressure-assisted seal is in the closed configuration, and wherein the airtight flexible membrane, when inflated, generates a force transverse to the pressure-assisted seal tending to disengage the first and second seal components and open the pressure-assisted seal, and wherein pressurized gas inside the airtight flexible membrane causes the first and second seal components to more securely engage one another when the pressure-assisted seal is in the closed position whereby a force transverse to the pressure-assisted seal required to disengage the first and second seal components and open the pressure-assisted seal increase as a pressure of pressurized gas inside the airtight flexible membrane increases.

19. The inflatable pressure structure of claim 18, wherein:
the first seal component includes a connecting portion that is received in a channel of the second seal component; and
the pressure-assisted seal is configured such that pressurized gas in the airtight flexible membrane causes the connecting portion to be clamped in the channel.

20. The inflatable pressure structure of claim 19, wherein:
the pressure-assisted seal is configured such that the second seal component clamps onto the connection portion of the first seal component more tightly as a pressure of gas inside the inflatable pressure structure increases.

* * * * *